United States Patent
Eun et al.

(10) Patent No.: US 8,856,621 B2
(45) Date of Patent: Oct. 7, 2014

(54) MEMORY CONTROLLER FOR NONVOLATILE MEMORY DEVICE, MEMORY SYSTEM COMPRISING MEMORY CONTROLLER, AND RELATED METHODS OF OPERATION

(75) Inventors: Hee Seok Eun, Hwaseong-Si (KR); Jae Hong Kim, Seoul (KR); Hyung Joon Park, Yongin-Si (KR); Young Kwang Yoo, Suwon-Si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 194 days.

(21) Appl. No.: 13/606,188

(22) Filed: Sep. 7, 2012

(65) Prior Publication Data

US 2013/0124944 A1 May 16, 2013

(30) Foreign Application Priority Data

Nov. 15, 2011 (KR) .......................... 10-2011-0119020

(51) Int. Cl.
- *G11C 29/00* (2006.01)
- *G11C 11/34* (2006.01)
- *G06F 11/10* (2006.01)

(52) U.S. Cl.
CPC .................................. *G06F 11/1072* (2013.01)
USPC ...................................... 714/773; 365/185.09

(58) Field of Classification Search
USPC ............. 714/773, 763, 746, 752; 365/185.09, 365/185.29, 185.33; 711/103, 104, 100
See application file for complete search history.

(56) References Cited

U.S. PATENT DOCUMENTS

| | | | |
|---|---|---|---|
| 7,701,797 B2 * | 4/2010 | Cornwell et al. | 365/226 |
| 8,341,500 B2 * | 12/2012 | Byom et al. | 714/773 |
| 8,406,051 B2 * | 3/2013 | Patapoutian et al. | 365/185.03 |
| 8,595,601 B2 * | 11/2013 | Kim et al. | 714/780 |
| 2007/0109850 A1 | 5/2007 | Li et al. | |
| 2008/0101120 A1 | 5/2008 | Park et al. | |
| 2010/0182841 A1 | 7/2010 | Lee | |
| 2010/0232221 A1 | 9/2010 | Park et al. | |

FOREIGN PATENT DOCUMENTS

| | | |
|---|---|---|
| KR | 20100085672 A | 7/2010 |
| KR | 20100101896 A | 9/2010 |

* cited by examiner

*Primary Examiner* — Christine Tu
(74) *Attorney, Agent, or Firm* — Volentine & Whitt, PLLC

(57) ABSTRACT

A nonvolatile memory device comprises a memory controller having a memory cell status estimator that generates status estimation information indicating the status of a memory cell based on status register data, a coupling group index selector configured to generate a select signal for selecting a page and coupling group index from the status estimation information, and a memory cell status value generator configured to map the status estimation information to the data reliability decision bits and the coupling group index and generate a status value of the memory cell for error correction code decoding.

20 Claims, 19 Drawing Sheets

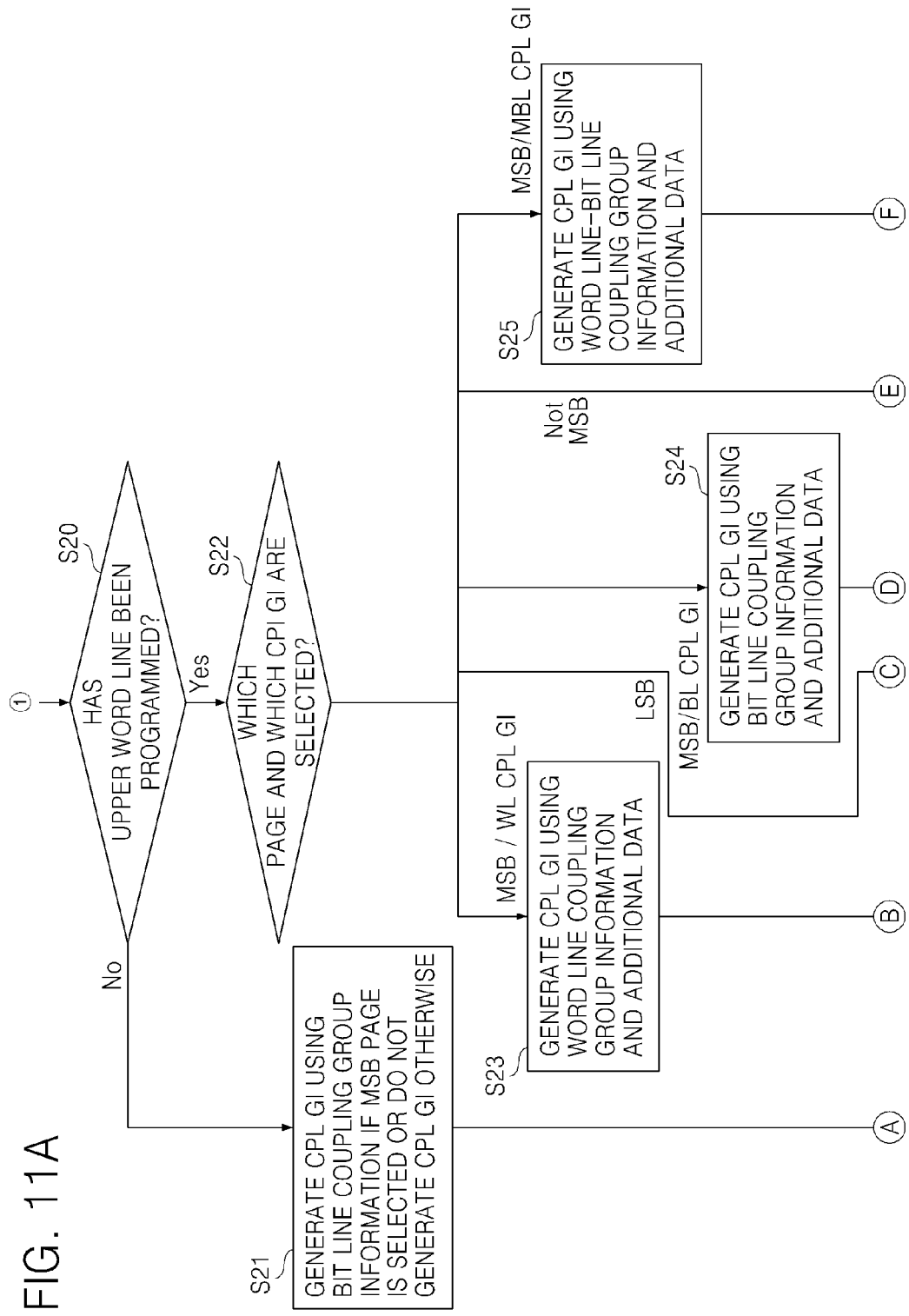

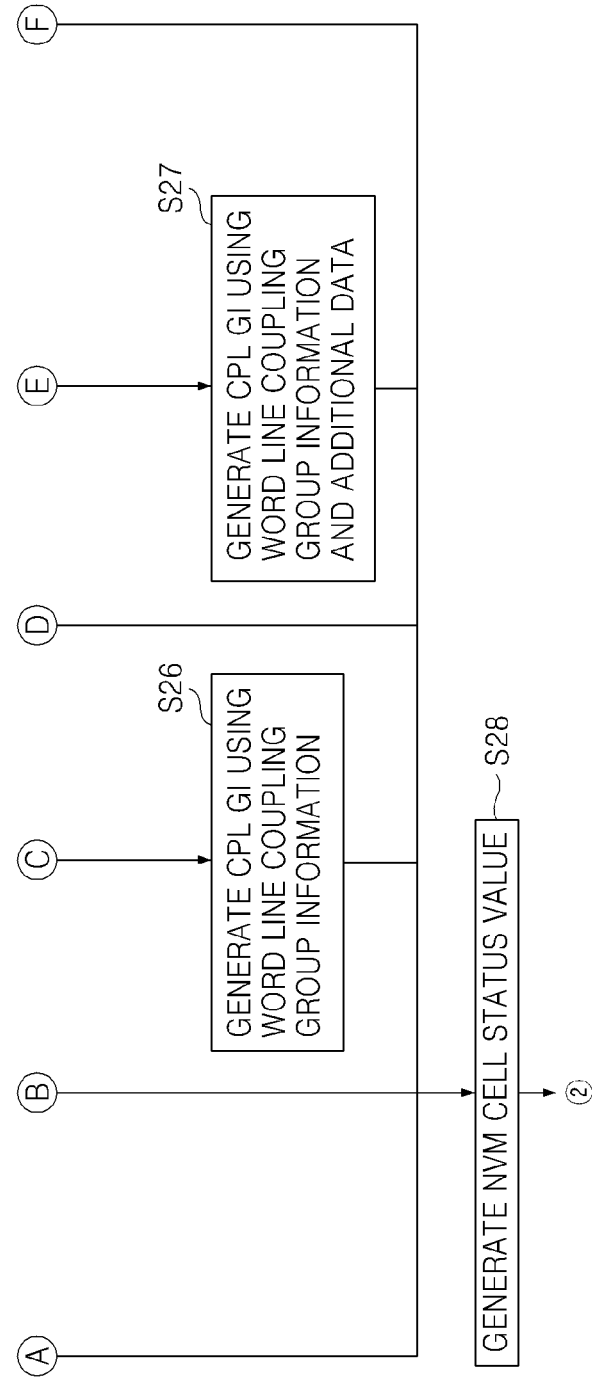

MEMORY CONTROLLER FOR NONVOLATILE MEMORY DEVICE, MEMORY SYSTEM COMPRISING MEMORY CONTROLLER, AND RELATED METHODS OF OPERATION

CROSS-REFERENCE TO RELATED APPLICATIONS

This application claims priority under 35 U.S.C. §119 to Korean Patent Application No. 10-2011-0119020 filed on Nov. 15, 2011, the disclosure of which is hereby incorporated by reference in its entirety.

BACKGROUND OF THE INVENTION

Embodiments of the inventive concept relate generally to electronic memory technologies. More particularly, embodiments of the inventive concept relate to a memory controller for a nonvolatile memory device, a memory system comprising the memory controller, and related methods of operation.

Certain types of nonvolatile memory devices perform program and erase operations using electrical control mechanisms. For example, some nonvolatile memory devices perform program and erase operations by moving electrons across an insulating layer to change a memory cell's threshold voltage.

When programming nonvolatile memory cells by changing their threshold voltages, it is generally difficult or impossible to change the threshold voltages with absolute precision. Accordingly, different program states are generally characterized by different ranges or distributions of threshold voltages. As the threshold voltage distributions become wider, the read margins for distinguishing between different program states tend to become smaller. These smaller read margins can lead to errors and general deterioration of device performance. Such deterioration is of particular concern in multi-level cell (MLC) memory devices where there are many possible program states and relatively small read margins.

FIG. 1 is a diagram of a cell array in a conventional nonvolatile memory device 1.

Referring to FIG. 1, a memory cell MC0 is electrically influenced by adjacent or neighboring memory cells in a program operation. Due to neighboring cells MC1 through MC8, a threshold voltage of the memory cell MC0 may shift even if it is not directly programmed. Memory cells that exert the influence (e.g., MC1 through MC8), are referred to as aggressor cells and a cell that is influenced (e.g., MC0) is referred to a victim cell.

A threshold voltage may change (e.g., decrease) due to a coupling effect, lapse of time, hot temperature stress (HTS), or degradation of an oxide layer caused by an increase in a program-erase (P-E) cycle. In other words, the threshold voltage of the memory cell, i.e., the victim cell MC0 shifts by a certain level from an original threshold voltage. In another case, the threshold voltage of the memory cell MC0 may increase due to program disturbance occurring when an adjacent cell is programmed.

The charge loss in the aggressor cells MC1 through MC8 may be considered as another physical cause of the change in the threshold voltage. In another case, the distribution may be deteriorated by lateral charge spreading in which charges move to adjacent cells because of the properties of an element such as a floating gate in a charge trap flash (CTF) memory. Furthermore, adjacent cells exerting a physical influence may change with different programming methods.

The shift of the threshold voltage of the memory cell MC0 is not restricted to a particular operation or context. For example, it is not restricted to situations where memory cell MC0 is connected to the same bit line BL1 as memory cells MC3 and MC6 or the same word line WL1 as the memory cells MC1 and MC2. Due to the shift of threshold voltage, where a read operation is performed on nonvolatile memory device 1, a read margin is reduced and two adjacent distributions of threshold voltage distributions may overlap with each other. In this case, data that has been read may have error bits, which can reduce reliability and increase a failure rate.

SUMMARY OF THE INVENTION

According to one embodiment of the inventive concept, a method of controlling a nonvolatile memory device comprises receiving status register data for at least one memory cell, the status register data indicating a result of a read operation performed on the memory cell using a first read voltage, generating a command control signal based on status estimation information and a select signal, the status estimation information indicating an estimated status of the memory cell based on the status register data, re-reading the memory cell using a second read voltage having a value determined by the command control signal and generating a coupling group index based on data reliability decision bits indicating reliability of data that has been re-read from the memory cell, additional data, and the select signal. In some embodiments, the method further comprises generating a status value of the memory cell based on the data reliability decision bits, the coupling group index, and the status estimation information, and performing error correction code decoding based on the status value.

According to another embodiment of the inventive concept, a memory controller comprises a central processing unit configured to control a read operation to be performed on at least one nonvolatile memory cell in a nonvolatile memory device using a first read voltage, receive status register data regarding the read operation, and control the at least one memory cell to be re-read using a second read voltage in response to a select signal, a data buffer configured to receive data reliability decision bits and additional data, which are output in the read operation, from the nonvolatile memory device and to store the data reliability decision bits and the additional data, and a coupling group index unit configured to generate the select signal using coupling group information obtained from the status register data, the data reliability decision bits, and the additional data.

According to another embodiment of the inventive concept, a memory system comprises a nonvolatile memory device comprising a memory cell array comprising a plurality of nonvolatile memory cells, an access circuit configured to perform a read operation on at least one memory cell among the nonvolatile memory cells and to generate data reliability decision bits, control logic configured to control the access circuit using a control signal and to generate status register data regarding the at least one memory cell according to the read operation, and a coupling group index generator configured to generate a coupling group index according to the read operation, and a memory controller comprising a memory cell status estimator configured to generate status estimation information indicating a status of the memory cell based on the status register data, a coupling group index selector configured to generate a select signal for selecting a page and coupling group index from the status estimation information, and a memory cell status value generator configured to map the status estimation information to the data reliability decision bits and the coupling group index and generate a status value of the memory cell for error correction code decoding.

These and other embodiments can potentially improve the reliability of nonvolatile memory devices.

BRIEF DESCRIPTION OF THE DRAWINGS

The drawings illustrate selected embodiments of the inventive concept. In the drawings, like reference numbers indicate like features, and the size and relative sizes of various features may be exaggerated for clarity.

FIG. 11 is a flowchart of an operation of generating a memory cell status value in the method illustrated in FIG. 10 according to an embodiment of the inventive concept.

DETAILED DESCRIPTION

Selected embodiments of the inventive concept are described below with reference to the accompanying drawings. The inventive concept may, be embodied in many different forms and should not be construed as limited to the embodiments set forth herein. Rather, these embodiments are provided as teaching examples.

In the description that follows, where a feature is referred to as being "connected" or "coupled" to another feature, it can be directly connected or coupled to the other feature or intervening features may be present. In contrast, where a feature is referred to as being "directly connected" or "directly coupled" to another feature, there are no intervening features present. As used herein, the term "and/or" indicates any and all combinations of one or more of the associated listed items and may be abbreviated as "/".

Although the terms first, second, etc. may be used herein to describe various features, the described features should not be limited by these terms. Rather, these terms are used merely used to distinguish between different features. For example, a first signal could be termed a second signal, and, similarly, a second signal could be termed a first signal without changing the meaning of the relevant description.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. The terms "comprises", "comprising,", "includes", "including", and the like, where used in this specification, specify the presence of stated features but do not preclude the presence or addition of other features.

Unless otherwise defined, all terms (including technical and scientific terms) used herein have the same meaning as commonly understood by one of ordinary skill in the art to which this invention belongs. Terms such as those defined in commonly used dictionaries should be interpreted as having a meaning that is consistent with their meaning in the context of the relevant art and/or the present application and will not be interpreted in an idealized or overly formal sense unless expressly so defined herein.

Figure 2:
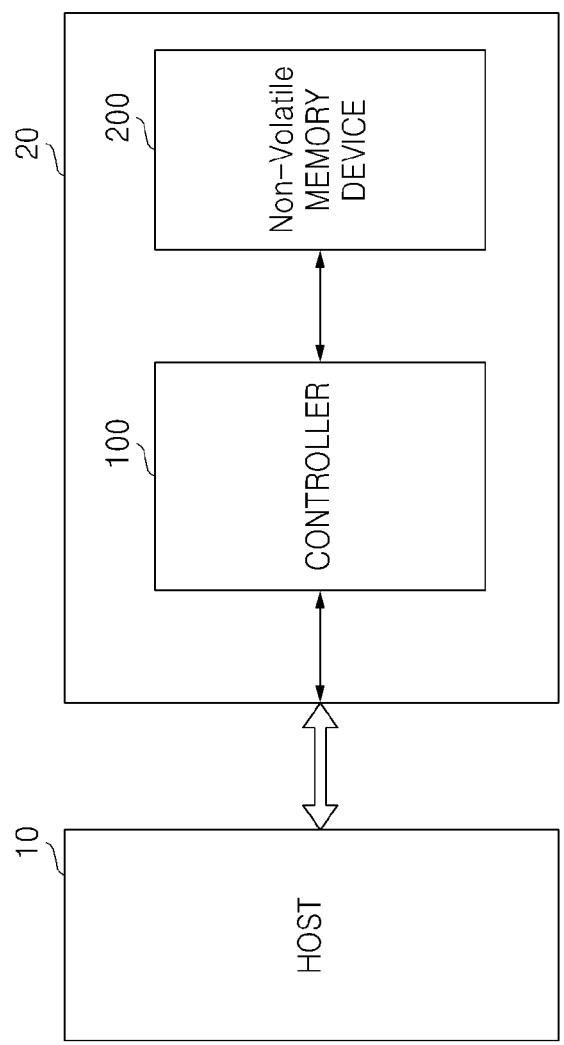
FIG. 2 is a block diagram of a memory system according to an embodiment of the inventive concept.
Figure 3:
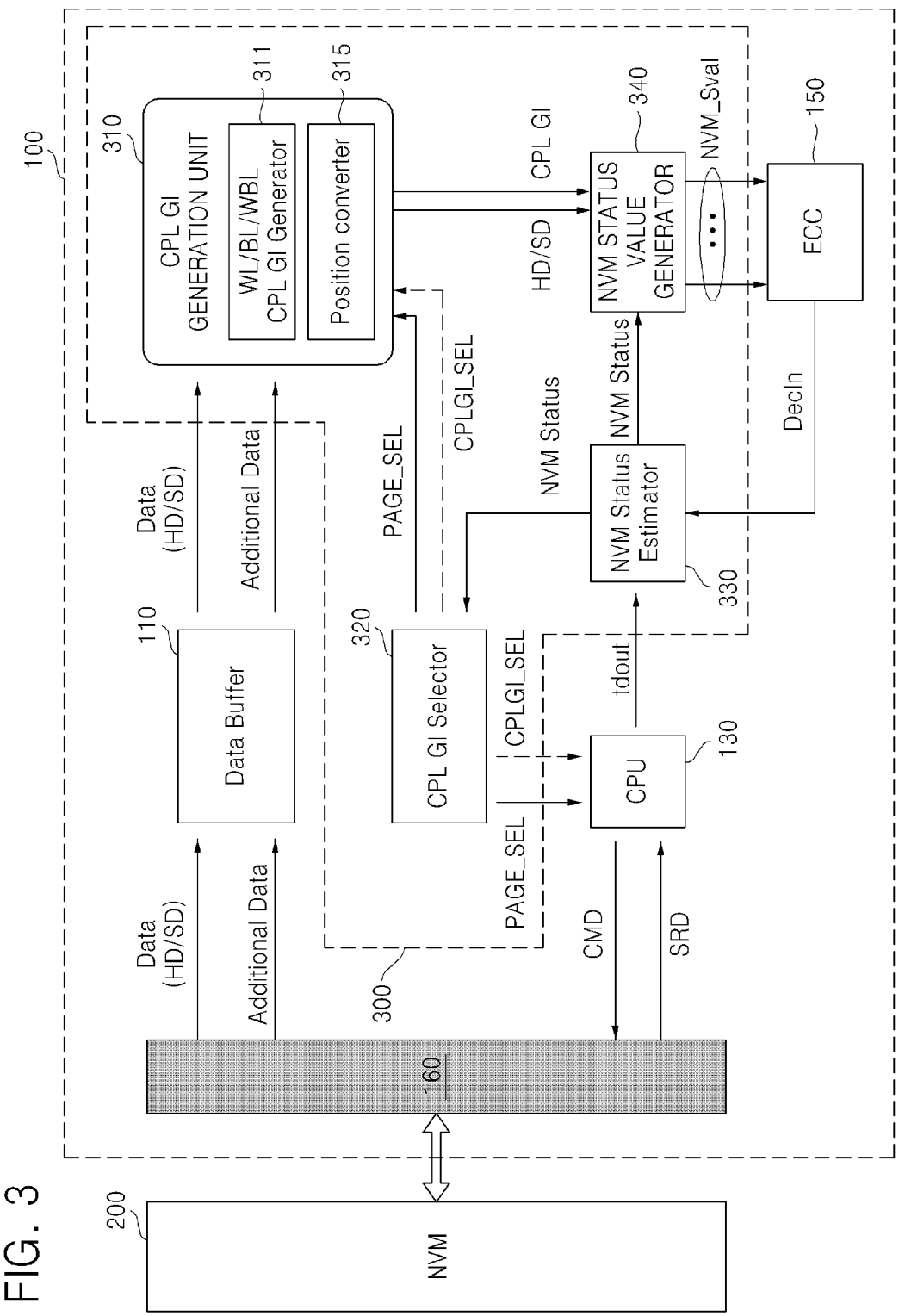
FIG. 3 is a block diagram of a memory controller illustrated in FIG. 2 according to an embodiment of the inventive concept.

FIG. 2 is a block diagram of a memory system 20 according to an embodiment of the inventive concept. FIG. 3 is a detailed block diagram of a memory controller 100 illustrated in FIG. 2.

Referring to FIG. 2, memory system 20 is connected to a host 10 and comprises a memory controller 100 and a nonvolatile memory device 200. Memory system 20 may be any system that includes a nonvolatile memory device.

Memory controller 100 generates an address and a command (e.g., a program command, a read command, or an erase command) for controlling the operation (e.g., a program operation, a read operation, or an erase operation) of nonvolatile memory device 200 (e.g., a flash memory device). The program and read operations are performed in units of pages while the erase operation is performed in units of blocks.

Memory controller 100 outputs a command CMD for controlling the operation of nonvolatile memory device 200 to nonvolatile memory device 200 at the request of host 10. Nonvolatile memory device 200 performs an operation in response to command CMD and transmits a result of the operation to memory controller 100. Nonvolatile memory device 200 is connected with memory controller 100 via a bus. Command CMD, data and a status signal are transmitted through the bus.

Memory system 20 may be incorporated in a package, and it may be implemented as a universal serial bus (USB) flash drive or a memory stick, for example.

Referring to FIG. 3, memory controller 100 comprises a data buffer 110, a coupling group index (CPL GI) unit 300, a central processing unit 130, an error correction code (ECC) block 150, and a memory interface 160.

Data buffer 110 is used as an operation memory of CPU 130. Data buffer 110 is typically implemented by dynamic random access memory (DRAM) or a static random access memory (SRAM). Data buffer 110 receives and stores data reliability decision bits generated in the read operation from nonvolatile memory (NVM) device 200. Here, the data reliability decision bits may include hard decision bits HD and soft decision bits SD, which correspond to an estimate of the reliability of the read data. A host interface (not shown) provides an interface between host 10 and memory controller 100 for data exchange according to a protocol of host 10.

CPU 130 controls data transmission through the bus among data buffer 110, the host interface, ECC block 150, and memory interface 160. Memory interface 160 provides an interface between NVM device 200 and memory controller 100 for data exchange. During typical operation, CPU 130 controls a read operation to be performed at least one NVM cell using a first read voltage and receives status register data (SRD) regarding the read operation. In addition, CPU 130 receives a page select signal PAGE_SEL and a CPL GI select signal CPLGI_SEL from a CPL GI selector 320 and outputs a command control signal CMD to NVM device 200 to control NVM device 200 to perform a read operation using a second read voltage. The second read voltage may be the same as the first read voltage, or it may be adjusted to be different from the first read voltage in response to command control signal CMD.

ECC block 150 performs error detection and error correction whenever a read operation is performed. ECC block 150 performs error correction decoding on the read data and sends decoding information DecIn regarding the decoding result to CPL GI unit 300. Here, decoding information DecIn is the error correction decoding result reflecting a read status value NVM_Sval of at least one NVM cell.

CPL GI unit 300 is a module that compensates for a coupling effect on the memory cell in the read operation. In detail, CPL GI unit 300 generates select signals PAGE_SEL and CPLGI_SEL using the SRD, data reliability decision bits HD and SD, and CPL GI obtained from additional data in order to compensate for the coupling effect. CPL GI unit 300 is separated from CPU 130 in the embodiments illustrated in FIG. 3, but the inventive concept is not restricted to this configuration. For example, in other embodiments, CPL GI unit 300 may be implemented within CPU 130 to control the read operation of NVM device 200.

CPL GI unit 300 comprises a CPL GI generation unit 310, CPL GI selector 320, an NVM status value generator 340, and an NVM status estimator 330. CPL GI generation unit 310, CPL GI selector 320, the NVM status value generator 340, and NVM status estimator 330 may be implemented as modules, so they may be logically or functionally separated from one another; nevertheless, they are not necessarily separated as individual physical devices or composed of separate codes. In addition, a module may refer to a functional and structural combination of hardware and software. For instance, the module may refer to a logical unit that includes a predetermined code and a hardware resource for executing the code, but does not necessarily refer to a physically connected code or a single kind of hardware.

CPL GI generation unit 310 generates the CPL GI using the select signals PAGE_SEL and CPLGI_SEL, data reliability decision bits HD/SD, and the additional data. CPL GI generation unit 310 comprises a CPL GI generator 311 and a position converter 315.

CPL GI generator 311 generates the CPL GI. The CPL GI is generated based on the additional data and data reliability decision bits HD/SD. The additional data may include word line coupling group information, bit line coupling group information, and word line-bit line coupling group information. The CPL GI is further described with reference to FIG. 7 below.

Figure 1:
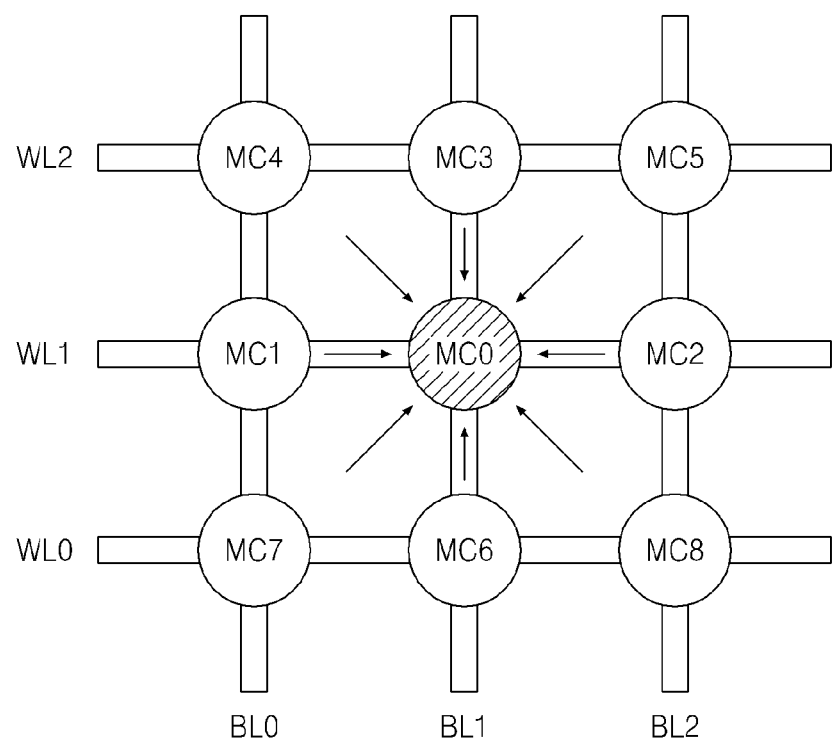
FIG. 1 is a diagram of a cell array in a conventional nonvolatile memory device.

When obtaining group information of aggressor cells positioned in a bit line in which a victim cell in a page to be read is positioned, position converter 315 converts a logical address of the bit line in a memory array into a physical address. As described with reference to FIG. 1, aggressor cells influencing the victim cell may be positioned in a bit line as well as an upper word line. Where CPL GI generator 311 uses bit line coupling group information or word line-bit line coupling group information, position converter 315 informs CPL GI generator 311 of a physical position corresponding to a logical position of each of memory cells located in the bit line.

CPL GI selector 320 generates CPL GI select signal CPLGI_SEL and page select signal PAGE_SEL from status estimation information NVM Status. The select signals PAGE_SEL and CPLGI_SEL are used to determine a type of group index, i.e., word line coupling group index, bit line coupling group index, or word line-bit line coupling group index, of aggressor cells.

NVM status estimator 330 generates status estimation information NVM Status from a transfer signal tdout and decoding information DecIn. Status estimation information NVM Status is information about degradation of memory cells, which includes information about whether a victim cell, i.e., a memory cell subjected to a read operation and memory cells positioned in an upper word line have been programmed, a program-erase (P-E) cycle, and page position information.

The NVM status value generator 340 receives status estimation information NVM Status, data reliability decision bits HD and SD, and the CPL GI and generates and outputs status value NVM_Sval of NVM memory cells to ECC block 150. Status value NVM_Sval will be further described with reference to FIG. 6 below.

Figure 4:
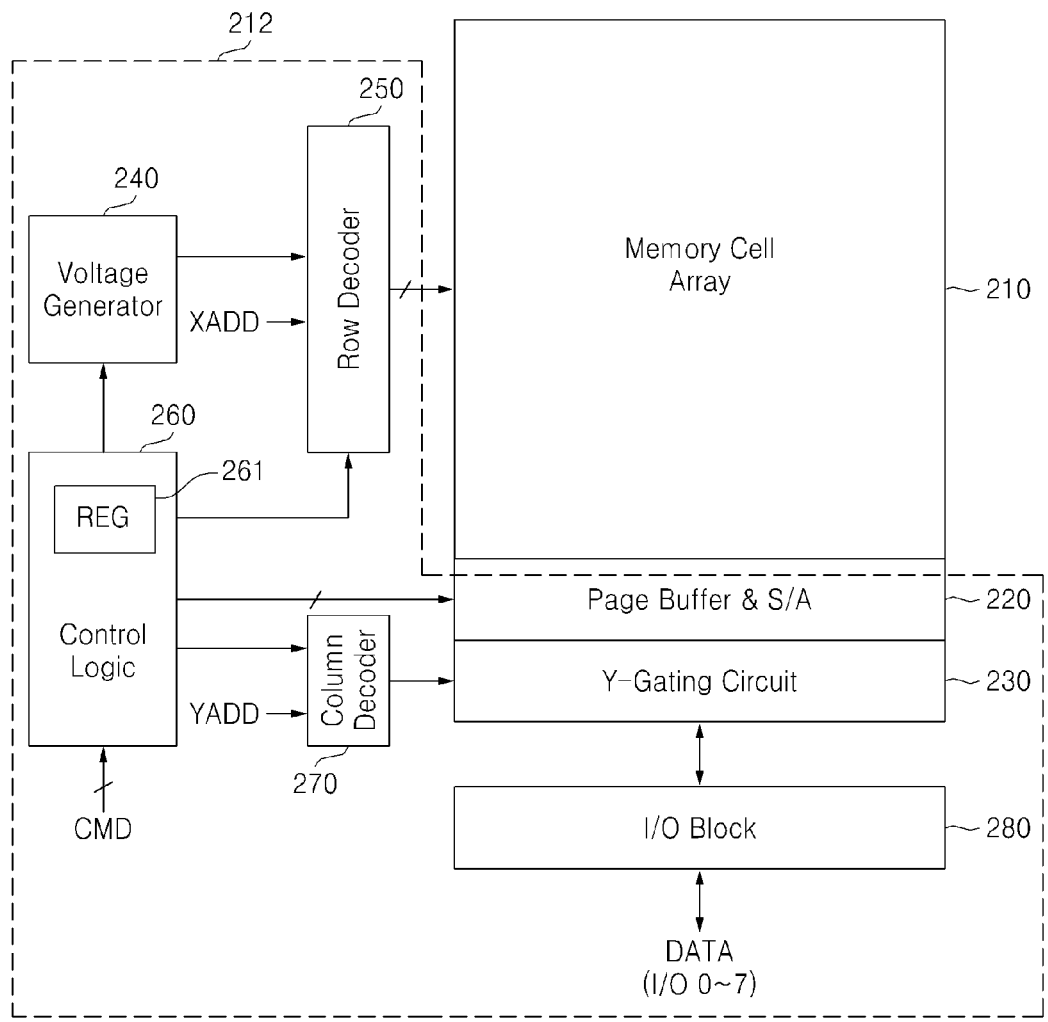
FIG. 4 is a block diagram of a nonvolatile memory device illustrated in FIG. 2.
Figure 5A:
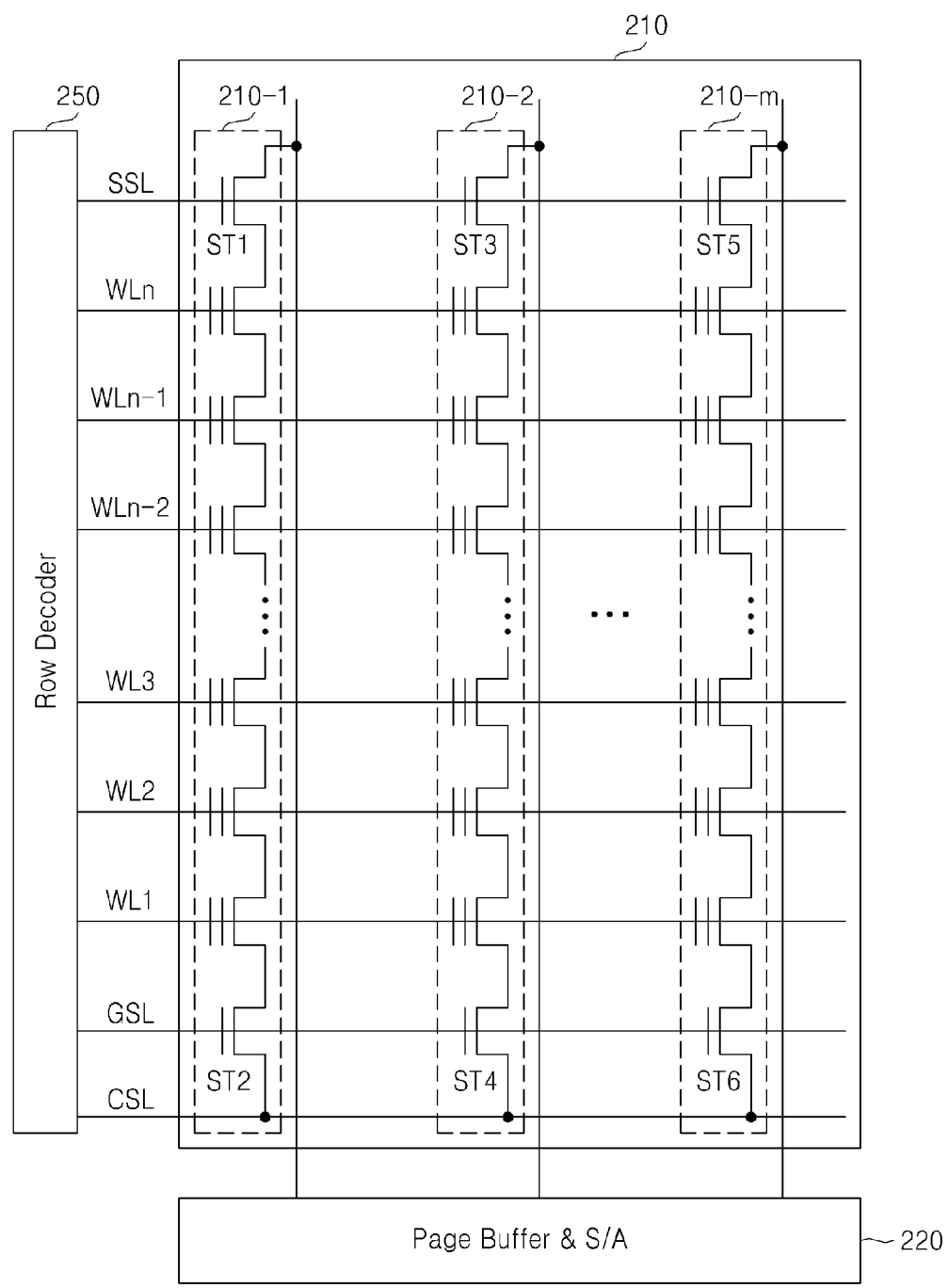
FIG. 5A is a diagram of a memory cell array illustrated in FIG. 4 according to an embodiment of the inventive concept.
Figure 5B:
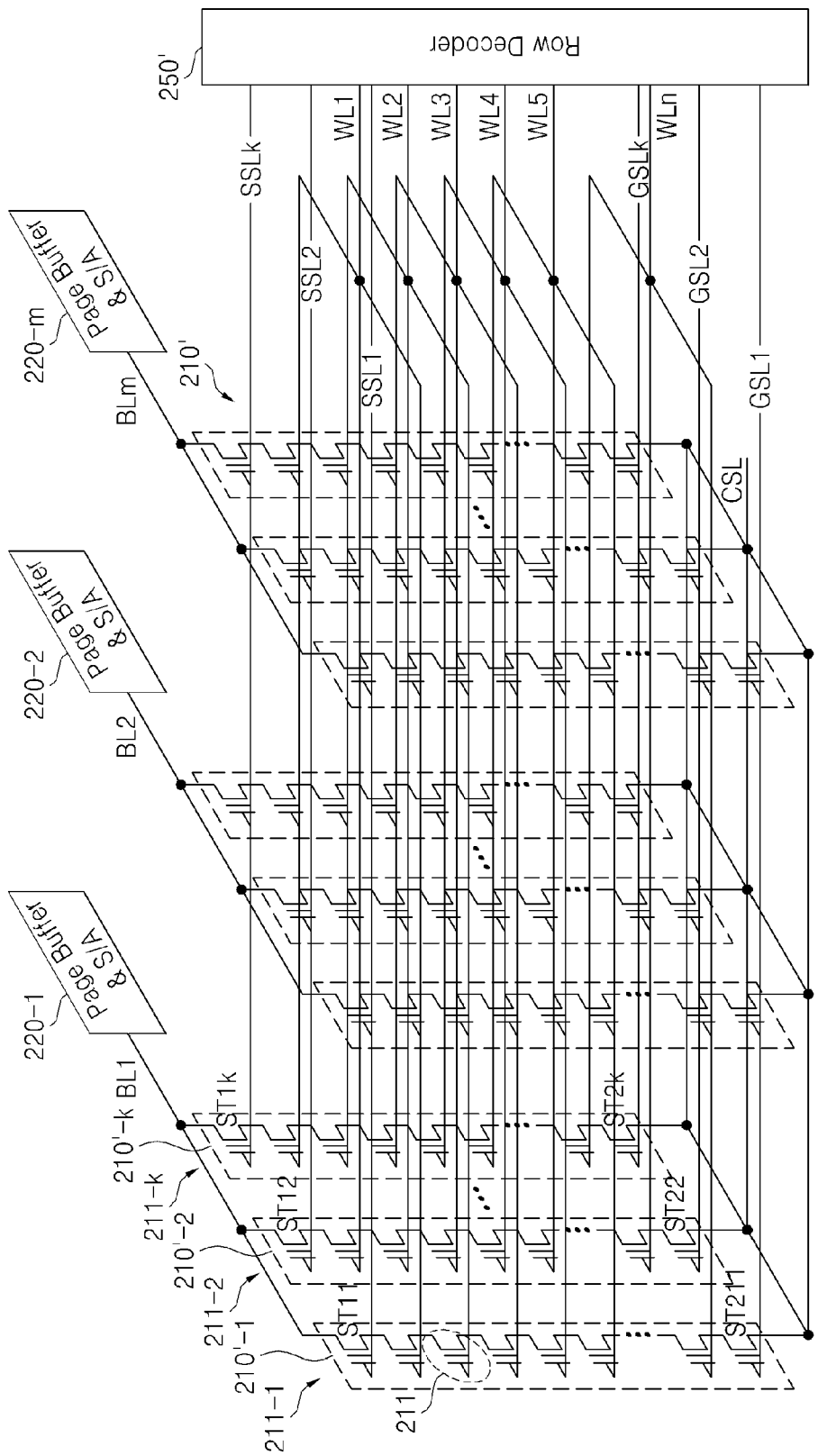
FIG. 5B is a diagram of the memory cell array illustrated in FIG. 4 according to another embodiment of the inventive concept.

FIG. 4 is a block diagram of NVM device 200 of FIG. 2. FIG. 5A is a diagram of a memory cell array 210 illustrated in FIG. 4 according to an embodiment of the inventive concept. FIG. 5B is a diagram of memory cell array 210 illustrated in FIG. 4 according to another embodiment of the inventive concept.

Referring to FIG. 4, NVM device 200 comprises a memory cell array 210 and an access circuit 212.

Memory controller 100 and NVM device 200 are connected with each other through a plurality of channels. A plurality of flash memory elements are connected to each of the channels.

Memory cell array 210 comprises NAND memory cell strings respectively connected to bit lines. Each of the NAND memory cell strings comprises a plurality of NVM cells connected in series to one another.

Each NAND memory cell string may be laid out on one plane (or layer) in two dimensions as illustrated in FIG. 5A. Alternatively, memory cell array 210 may be implemented in three dimensions, as illustrated in FIG. 5B, using a wafer stack, a chip stack, or a cell stack formed through, for example, a through silicon via (TSV), wire bonding, or a bump.

The NAND memory cell string comprises the NVM cells connected in series between a string selection transistor connected to one of the bit lines and a ground selection transistor connected to a common source line (CSL). A gate of the string selection transistor is connected to a string selection line (SSL). Gates of the respective NVM cells are connected to a plurality of word lines WL1 through WLn, respectively. A gate of the ground selection transistor is connected to a ground selection line (GSL). The number of word lines WL1 through WLn may vary with different embodiments.

The NVM cells in the NAND memory cell strings may be implemented using flash electrically erasable programmable read-only memory (EEPROM) which can store one or more bits. Accordingly, each of the NVM cells may be embodied by a NAND flash memory cell storing at least one bit, e.g., a single level cell (SLC) or a multi-level cell (MLC).

Access circuit 212 accesses memory cell array 210 to perform a data access operation, e.g., a read operation, according to a command (or command sets) and an address received from an external source, e.g., memory controller 100. Access circuit 212 comprises a voltage generator 240, a row decoder 250, a column decoder 270, a page buffer and sense amplifier (S/A) block 220, a Y-gating circuit 230, a control logic 260, and an input/output (I/O) block 280.

Voltage generator 240 generates a plurality of voltages necessary for data access operations in response to a control signal generated by control logic 260. For instance, voltage generator 240 may generate a plurality of read voltages necessary to perform the read operation in response to the control signal and outputs the read voltages to row decoder 250. At this time, the level or the magnitude of the read voltages may be determined based on the control signal.

Under the control of control logic 260, column decoder 270 decodes a column address YADD and outputs a plurality of select signals to Y-gating circuit 230.

Page buffer and S/A block 220 comprises a plurality of page buffers, which are respectively connected with the bit lines. The page buffers sense and amplify data read from memory cell array 210 in a read operation and temporarily stores data to be programmed in a program operation according to the control of control logic 260. Accordingly, each of the page buffers in page buffer and S/A block 220 may function as a sense amplifier or a write driver according to the operation under the control of control logic 260.

Meanwhile, as the number of bits stored in MLCs increases, the page buffers may wrongly sense each of a plurality of bits stored in each of the MLCs in the read operation. For this reason, page buffer and S/A block 220 may provide data reliability decision bits that indicate the degree of read reliability of each of the bits stored in each MLC.

Y-gating circuit 230 may control transmission of data between page buffer and S/A block 220 and I/O block 280 in response to the select signals received from column decoder 270.

Control logic 260 controls the overall operation of access circuit 212 in response to command signal CMD output from memory controller 100. For instance, control logic 260 may generate a control signal for controlling voltage generator 240 based on command signal CMD or special information. Control logic 260 may also control read status information to be sensed during the read operation of memory cell array 210 and control data that has been read to be output to memory controller 100.

Control logic 260 comprises a memory or a status register 261. Where NVM device 200 performs a read operation, a program operation, or an erase operation, a parameter value related to the operation or information (e.g., at least one among a program loop count, a program voltage, and a P-E cycle) corresponding to the parameter value is stored in status register 261.

I/O block 280 transmits data from an outside to Y-gating circuit 230, or it transmits data from Y-gating circuit 230 to memory controller 100 through a plurality of I/O pins I/O 0 through 7 (or a data bus).

Figure 6:
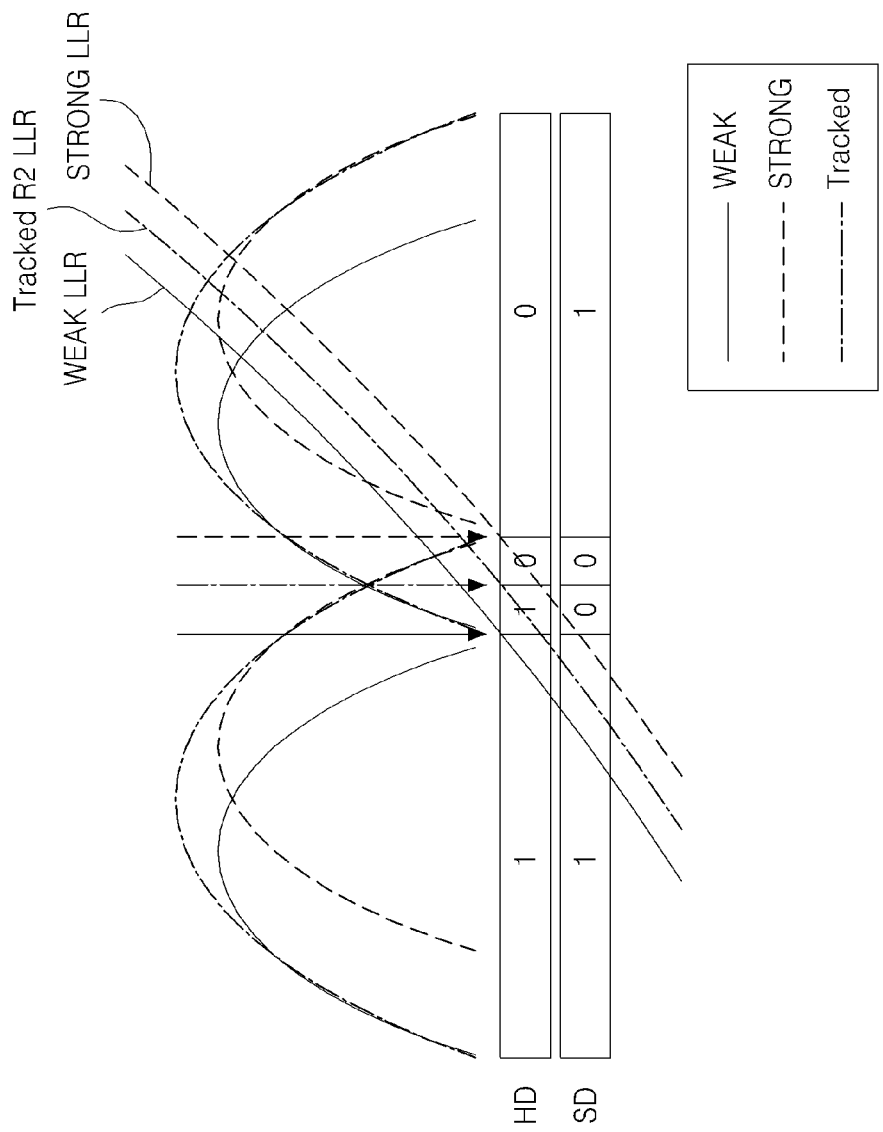
FIG. 6 is a diagram showing distributions of memory cells where a least significant bit (LSB) page is read and where an upper word line of a victim cell has been programmed.
Figure 7:
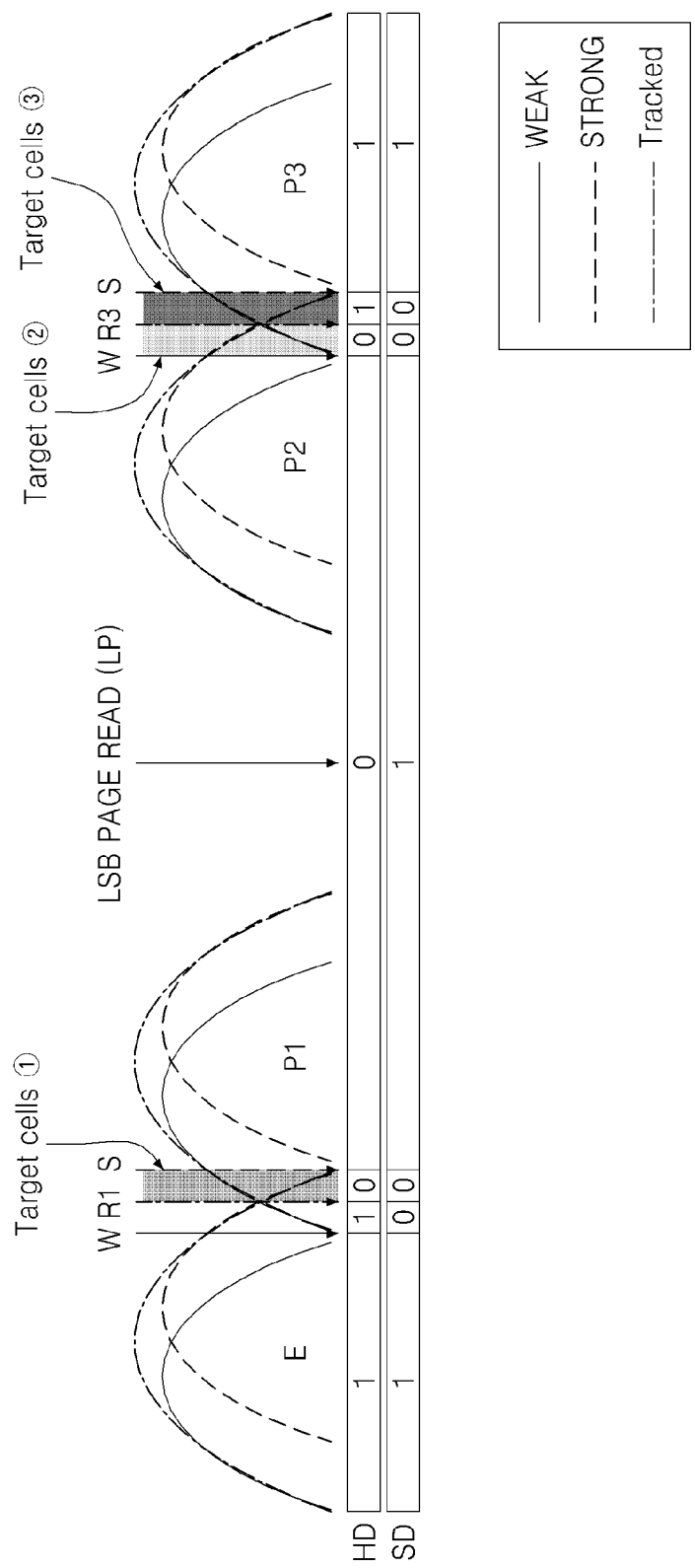
FIG. 7 is a diagram showing distributions of memory cells where a page other than the LSB page is read and where an upper word line of the page has been programmed.
Figure 8:
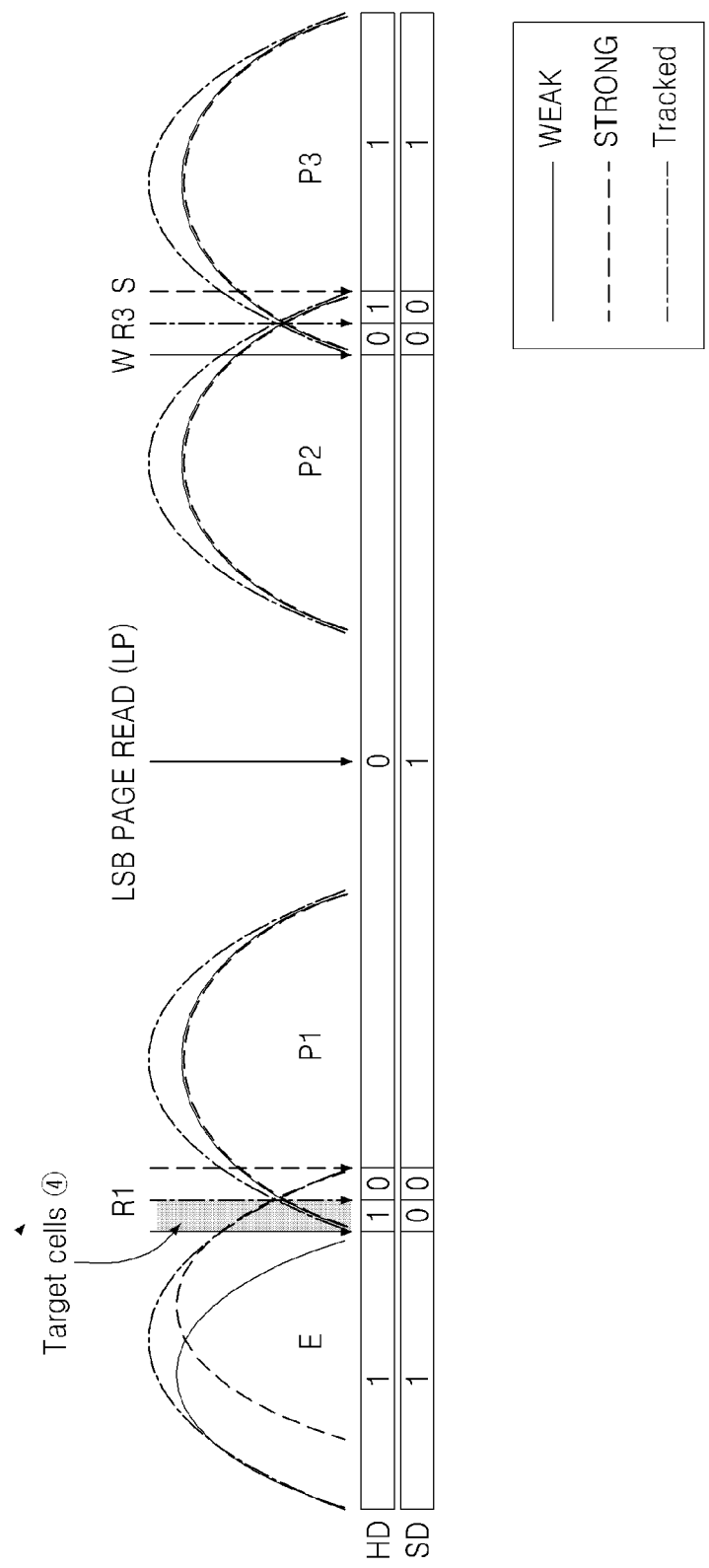
FIG. 8 is a diagram showing distributions of memory cells where a read page is a most significant bit (MSB) page and when there is a coupling effect in a bit line direction.

FIGS. 6 through 8 show the threshold voltage distributions of memory cells positioned in a word line corresponding to a current page and memory cells positioned in an upper word line. A page typically includes $2^N$-bit cells, but for simplicity it will be assumed that memory cells are 2-bit MLCs.

Where "k" bits are programmed to a memory cell in a MLC memory, one of $2^k$ threshold voltages needs to be formed in the memory cell. Due to a fine difference in electrical characteristics among a plurality of memory cells, threshold voltages of respective memory cells programmed with the same data form a threshold voltage distribution in a certain range. A threshold voltage distribution may correspond to each of $2^k$ data values that can be generated by "k" bits. For instance, for 2-bit MLCs, four threshold voltage distributions are formed for three programmed states P1, P2, and P3 and one erased state E, respectively.

A threshold voltage distribution may overlap with an adjacent threshold voltage distribution because of the deterioration of the characteristics of the memory cells. When the distributions overlap, error bits may exist in data that has been read using a particular read voltage.

For the reliability of data, a read operation includes a hard decision read and a soft decision read. The hard decision read is an operation of reading data as 1 or 0 according to the on or off of a memory cell when a predetermined reference read voltage is applied to the memory cell. The soft decision read is an operation of applying a plurality of variable read voltages (i.e., soft decision read voltages) having a predetermined voltage difference from a hard decision read voltage, thereby forming information about data reliability added to hard decision read data. For instance, when a soft decision bit is 1, it may mean that the reliability of a hard decision bit is strong. Where the soft decision bit is 0, it may mean that the reliability of the hard decision bit is weak. However, the inventive concept is not restricted to this example.

FIG. 6 is a diagram showing distributions of memory cells when a least significant bit (LSB) page is read and when an upper word line of a victim cell has been programmed.

Referring to FIG. 6, in a data reliability decision read operation, hard decision bits HD of "1,0" are output for the LSB page according to on/off states of memory cells. Thereafter, a plurality of variable voltages, i.e., soft decision read voltages (not shown), which have a predetermined voltage difference from a first reference voltage, i.e., a hard decision read voltage R2, are applied to NVM device 200. Soft decision bits SD of "1,0,0,1", which add reliability information to the hard decision bits HD, are output using the soft decision read voltages.

As described above, the soft decision bits SD are added to the hard decision bits HD for the reliability of data, and a read operation is performed using log likelihood ratio (LLR) values obtained by mapping the hard decision bits HD and the soft decision bits SD using an LLR function. The distributions of MLCs in the LSB page illustrated in FIG. 6 may be represented by data reliability decision bits HD and SD and the memory cell status value NVM_Sval based on a programmed state and an LLR, as shown in Table 1. At this time, the memory cell status value NVM_Sval, i.e., the LLR is a predetermined value. In Table 1, A and B are positive numbers greater than 0 and A is greater than B.

TABLE 1

| HD | 1 | 1 | 0 | 0 |
|---|---|---|---|---|
| SD | 1 | 0 | 0 | 1 |
| NVM_Sval | −A | −B | +B | +A |

The above-described information does not reflect the influence of aggressor cells that have a coupling effect on a victim cell. However, when adjacent cells (or aggressor cells) have the coupling effect on the victim cell, a threshold voltage distribution changes, and therefore, it is difficult to ensure the reliability with only data reliability decision bits HD and SD.

gray code assignment is used, only one bit is influenced even when a threshold voltage wrongly shifts to an adjacent state.

TABLE 2

| HD | 1 | 1 | 1 | 1 | 0 | 0 | 0 | 0 |
|---|---|---|---|---|---|---|---|---|
| SD | 1 | 1 | 0 | 0 | 0 | 0 | 1 | 1 |
| CPL GI | 1 | 0 | 0 | 1 | 1 | 0 | 0 | 1 |
| NVM_Sval | $-A-\alpha1$ | $-A+\beta1$ | $-B+\beta2$ | $-B-\alpha2$ | $+B-\alpha3$ | $+B+\beta3$ | $+A+\beta4$ | $+A-\alpha4$ |

Where a read operation is performed using the hard decision read voltage R2, the distribution of memory cells is expressed as a main (or tracked) distribution. However, the main distribution substantially includes a plurality of distributions. For instance, as illustrated in FIG. 7, the distribution of memory cells of a target page including the victim cell may be expressed as a first sub distribution (or a weak distribution) with respect to a group of aggressor cells having a weak coupling effect. With respect to a group of aggressor cells having a strong coupling effect, the distribution of the memory cells in the target page may be expressed as a second sub distribution (or a strong distribution).

The group of the aggressor cells having a weak coupling effect typically corresponds to a situation where the distribution (i.e., the weak distribution) of memory cells is not influenced or is relatively less influenced by the aggressor cells in the upper word line. The group of the aggressor cells having a strong coupling effect typically corresponds to a situation where the distribution (i.e., the strong distribution) of memory cells is relatively more influenced by the aggressor cells in the upper word line. Here, two types of sub distributions are defined according to the influence of the coupling effect, but the inventive concept is not restricted to the current embodiments. More than two types of sub distributions may be defined according to the influence of the coupling effect.

Where the main (or tracked) distribution, the first sub (or weak) distribution, and the second sub (or strong) distribution are expressed by an LLR function on the basis of a conditional probability distribution function (PDF), they can be illustrated as shown in FIG. 6.

Referring to FIG. 6, the LLR function passes through a central border value (hereinafter, referred to as an origin) of the distribution. The main (or tracked) distribution has a main LLR (or a tracked LLR) that passes through a main origin and has a positive slope. The first sub (or weak) distribution has a first sub LLR (or a weak LLR) that is shifted to the left from the main LLR and passes through a first sub origin. The second sub (or strong) distribution has a second sub LLR (or a strong LLR) that is shifted to the right from the main LLR and passes through a second sub origin. Because the LLR is shifted by a certain value according to the influence of the coupling effect, where the memory cell status value NVM_Sval is mapped and subdivided based on the characteristics of coupling groups, i.e., the first sub LLR and the second sub LLR in addition to data reliability decision bits HD and SD, data reliability is improved further.

As shown in Table 2, a sub distribution is identified based on whether aggressor cells have strong or weak coupling effect on an MLC and is expressed as CPL GI, which is mapped to an LLR, i.e., a memory cell status value NVM_Sval. The CPL GI may be set using gray code assignment together with data reliability decision bits HD/SD. Where the As a result of reflecting the CPL GI, the memory cell status values NVM_Sval that have been expressed by "11", "10", "00", and "01" according to data reliability decision bits HD/SD with respect to the main distribution are expressed by eight values of "111", "110", "100", "101", "001", "000", "010", and "011". At this time, A, B, $\alpha1$, $\alpha2$, $\alpha3$, $\alpha4$, $\beta1$, $\beta2$, $\beta3$, and $\beta4$ are positive numbers greater than 0, and A is greater than B.

Because the NVM cell status values NVM_Sval in Table 2 is more subdivided than those in Table 1, memory controller 100 compensates for the coupling effect in the read operation of NVM device 200, thereby increasing the data reliability.

Accordingly, where the LSB page is read in a state where the upper word line has been programmed, as described above data reliability decision bits HD and SD are set based on the programmed state and the LLR of a main distribution and the CPL GI is set based on the programmed state and the LLR of a sub distribution defined by the influence of a coupling effect, so that the memory cell status value NVM_Sval is obtained using the LLR function. The CPL GI may be determined based on data reliability decision bits HD and SD and word line coupling group index.

FIG. 7 is a diagram showing the distributions of memory cells in a programmed state when the upper word line of the target page has been programmed.

Referring to FIG. 7, the distributions of memory cells in the programmed word line are represented by E, P1, P2, and P3. The distribution of the programmed memory cells may have different degrees of coupling influence exerted by adjacent cells according to various factors, such as a programming order and the program state of the upper word line. However, where a read operation is performed after the program operation, the memory cell distributions shown in FIG. 7 commonly appear regardless of the position of a target page of the read operation.

An example of reading a page other than the LSB page is described below.

The LSB page is read using a first reference voltage LP and whether the programmed state of the LSB page is in an E-P1 direction or a P2-P3 direction is determined. Thereafter, a subsequent page is read using a second reference voltage R1 or R3 and the programmed state of the page is determined. For instance, where data of the LSB page is "1" (i.e., the E-P1 direction), data of the subsequent page is determined to be in the E state or the P1 state using second reference voltage R1. Where the data of the LSB page is "0" (i.e., the P2-P3 direction), the data of the subsequent page is determined to be in the P2 state or the P3 state using second reference voltage R3.

Where second reference voltage R1 is applied to memory cells in the subsequent page in a state where the data of the LSB page is "1", the hard decision bits HD of "1,0" are output according to the on/off of the memory cells. Thereafter, a plurality of variable voltages (not shown, i.e., soft decision read voltages), which have a predetermined voltage difference from the second reference voltage, i.e., the hard decision read voltage R1, are applied to NVM device 200. Then, the soft decision bits SD of "1,0,0,1", which add reliability information to the hard decision bits HD, are output using the soft decision read voltages.

Where second reference voltage R3 is applied to the memory cells in the subsequent page in a state where the data of the LSB page is "0", the hard decision bits HD of "0,1" are output according to the on/off of the memory cells. Thereafter, a plurality of variable voltages (not shown, i.e., soft decision read voltages), which have a predetermined voltage difference from the second reference voltage, i.e., the hard decision read voltage R3, are applied to NVM device 200. Then, the soft decision bits SD of "1,0,0,1", which add reliability information to the hard decision bits HD, are output using the soft decision read voltages.

Accordingly, where the upper word line has been programmed, data reliability decision bits HD and SD are set based on the programmed state and the LLR of a main distribution for the LSB page and the CPL GI is set based on the programmed state and the LLR of a sub distribution defined by the influence of a coupling effect, so that an LLR value obtained from the LLR function, i.e., the memory cell status value NVM_Sval is obtained. The CPL GI may be determined based on data reliability decision bits HD and SD, word line coupling group index, and the LSB page data that has been read.

An example of reading a most significant bit (MSB) page is described below.

The MSB page is influenced by coupling effect of memory cells positioned in a word line and memory cells positioned in a bit line as well. Where an upper word line has been programmed, the programmed state of a memory cell subjected to a read operation is influenced by the upper word line. Where memory cells in the bit line in which the memory cell subjected to the read operation is positioned have been programmed, the erased state of the memory cell subjected to the read operation is influenced by those memory cells.

Where the upper word line and the bit line of the memory cell subjected to the read operation have been programmed, data reliability decision bits HD and SD are set based on the programmed state and the LLR of a main distribution of the MSB page and the CPL GI is set based on the programmed state and the LLR of a sub distribution defined by the influence of the coupling effect. In other words, the influence of the coupling effect may be represented by the memory cell status value NVM_Sval, i.e., an LLR value that is obtained from data reliability decision bits HD and SD and the CPL GI using the LLR function.

At this time, the CPL GI may be determined based on data reliability decision bits HD and SD, word line coupling group information, bit line coupling group information, and the LSB page data that has been read. However, because a bit line cannot be physically accessed at one time like a word line, position converter 315 converts a logical address of the bit line to a physical address, so that the bit line coupling group information can be accessed.

FIG. 8 is a diagram showing the distributions of memory cells when the MSB page in NVM device 200 of FIG. 4 is read and when there is a coupling effect in a bit line direction.

Where the MSB page has been programmed or the upper word line has not been programmed, only the coupling effect in the bit line direction is considered in the read operation of the MSB page. The separation of distributions by the bit line coupling effect may vary with the combination of aggressor cells. The separation of distributions is insubstantial in the programmed states P1, P2, and P3 but is clear in the erased state E in a main distribution.

For instance, as illustrated in FIG. 8, in a group of aggressor cells having weak coupling effect, the distribution of memory cells in a target page including a victim cell may be represented by a first sub distribution (or a weak distribution). In a group of aggressor cells having strong coupling effect, the memory cell distribution of the target page may be represented by a second sub distribution (or a strong distribution). Accordingly, the reliability of data near the second reference voltage, i.e., the hard decision voltage R1 in the distribution of the erased state E is expressed as Table 3, where A is a positive number greater than 0.

TABLE 3

| HD | 1 | 0 |
|---|---|---|
| CPL GI | 1 | 0 |
| NVM_Sval | −A | +A |

Accordingly, where a page other than the MSB page is read or when the upper word line of the MSB page has not been programmed, a hard decision bit HD is set based on the programmed state and the LLR of the main distribution of a target page in the erased state E and CPL GI is set based on the programmed state and the LLR of a sub distribution defined by the influence of coupling effect.

Target cells ④ may be extracted using the data reliability information HD near hard decision voltage R1. Target cells ④ are represented by the CPL GI with consideration of the bit line coupling effect. In other words, the influence of the coupling effect may be represented by the memory cell status value NVM_Sval, i.e., an LLR value that is obtained from the data reliability information HD and the CPL GI using the LLR function. For instance, the memory cell status value NVM_Sval is mapped to −A when the threshold voltage of a memory cell is less than the hard decision voltage R1 and is mapped to +A when the threshold voltage of the memory cell is greater than the hard decision voltage R1.

At this time, the CPL GI may be determined based on the data reliability information HD, the bit line coupling group index, and the LSB page data that has been read. Because a bit line cannot be physically accessed at one time like a word line, position converter 315 converts a logical address of the bit line to a physical address, so that the bit line coupling group information can be accessed.

Figure 9:
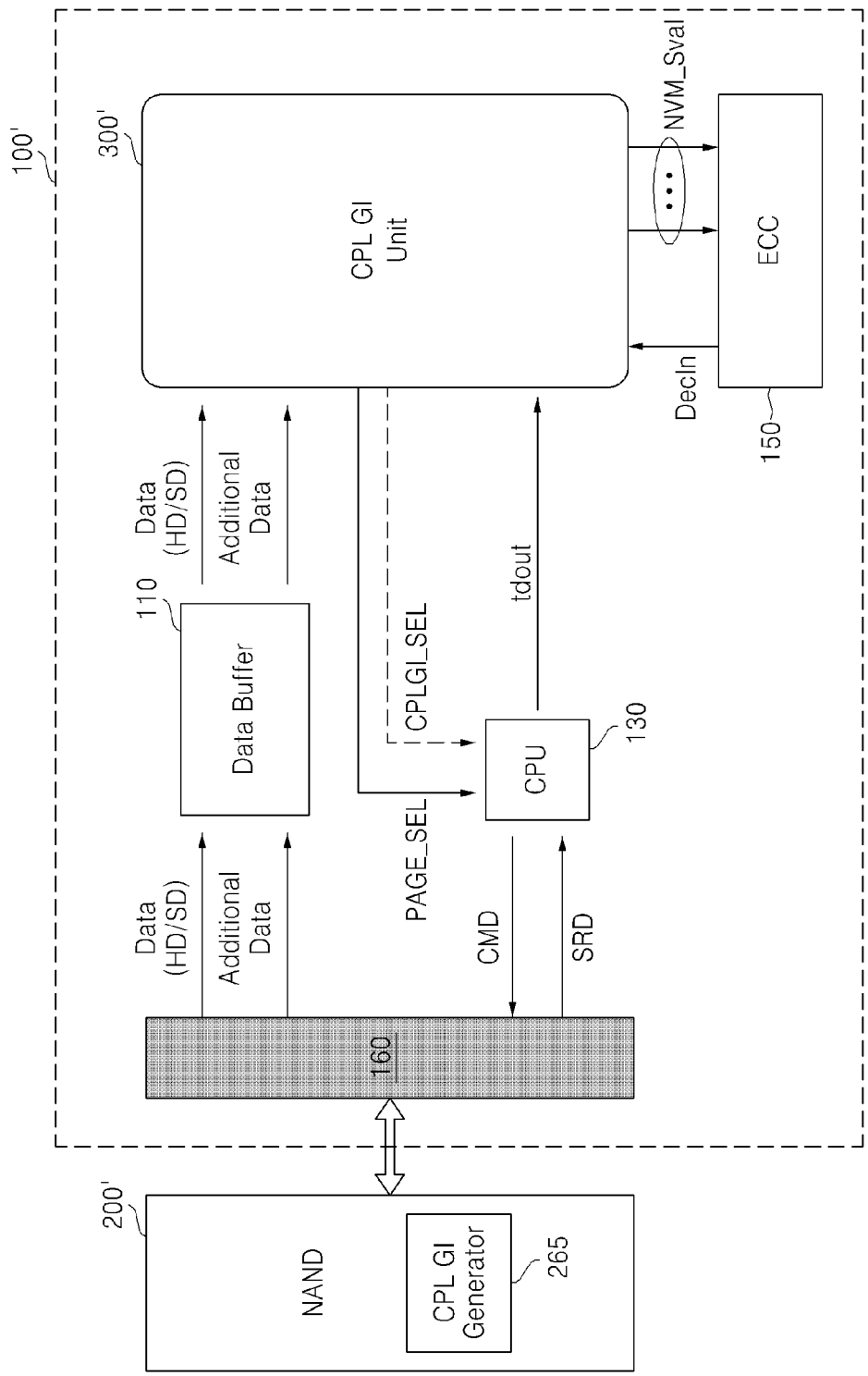
FIG. 9 is a block diagram of a memory system according to another embodiment of the inventive concept.

FIG. 9 is a block diagram of a memory system according to another embodiment of the inventive concept.

Referring to FIG. 9, the memory system comprises a memory controller 100' and a NVM device 200'. For the sake of brevity, only the differences between the embodiments illustrated in FIG. 9 and the embodiments illustrated in FIGS. 3 and 4 will be described.

Unlike NVM device 200 of FIG. 3, NVM device 200' comprises a CPL GI generator 265. CPL GI generator 265 can be implemented in a separate structure or may be included in control logic 260 or page buffer and S/A 220 within access circuit 212.

Page buffer and S/A 220 reads data from a memory cell, outputs the data under the control of control logic 260, and generates data reliability decision bits with respect to the data that has been read. Control logic 260 controls access circuit 212 using a control signal and generates SRD of a memory cell in a read operation of the memory cell.

CPL GI generator 265 generates CPL GI according to a read operation of NVM device 200'. However, unlike the CPL GI generation unit 310 illustrated in FIG. 3, CPL GI generator 265 cannot use bit line coupling group information and thus generates CPL GI using only word line coupling group information. This is because a physical address of a memory cell in a bit line cannot be detected within NVM device 200'.

Where an upper word line has been programmed and a select signal is for selecting the MSB page, CPL GI generator 265 uses the word line coupling group information and the additional information to generate the CPL GI. Where the select signal is not for selecting the MSB page, CPL GI generator 265 also uses the word line coupling group information and the additional information. Where the select signal is for selecting the LSB page, CPL GI generator 265 uses only the word line coupling group information to generate the CPL GI. When the upper word line has not been programmed, the CPL GI is not used. The additional data includes data reliability decision bits HD and SD corresponding to data read from a memory cell and the word line coupling group information. The additional data is generated by NVM device 200' and sent to memory controller 100'.

Memory controller 100' comprises data buffer 110, CPU 130, a CPL GI unit 300', and ECC block 150. Although not shown, CPL GI unit 300' typically comprises a memory cell status estimator, a CPL GI selector, and a memory cell status value generator.

The memory cell status estimator outputs status estimation information, which indicates the status of a memory cell, based on the SRD. The CPL GI selector generates the select signal for selecting a page and CPL GI from the status estimation information. The memory cell status value generator maps the status estimation information to the data reliability decision bits and the CPL GI, thereby generating a memory cell status value NVM_Sval used for error correction decoding.

Figure 10:
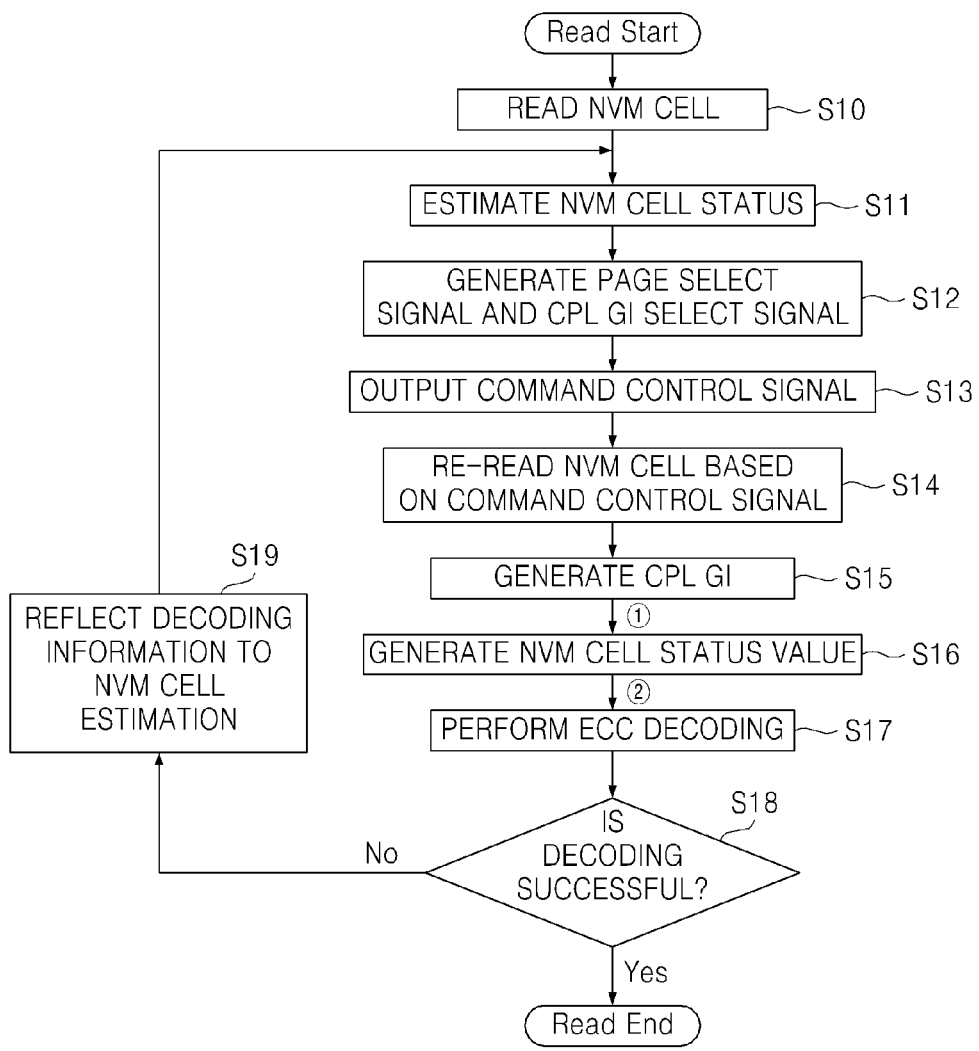
FIG. 10 is a flowchart of a memory operation control method according to an embodiment of the inventive concept.

FIG. 10 is a flowchart of a memory operation control method according to an embodiment of the inventive concept. FIG. 11A and FIG. 11B show a flowchart of an operation of generating a memory cell status value in the method illustrated in FIG. 10 according to an embodiment of the inventive concept.

Referring to FIGS. 3, 4 and 10, memory system 20 reads at least one NVM cell using a first read voltage in operation S10. At this time, SRD regarding the NVM cell is generated in control logic 260, and memory controller 100 receives the SRD.

Memory controller 100 estimates an NVM cell status derived from the SRD in operation S11. At this time, the transfer signal tdout based on which the estimation may be the SRD, which bypasses CPU 130, or a signal obtained after CPU 130 adjusts the SRD to be suitable to other elements. Memory controller 100 estimates the status of the memory cell that has been read and generates status estimation information NVM Status in operation S11. Status estimation information NVM Status is information about degradation of the memory cell, which includes information about whether memory cells positioned in a target page of a read operation and memory cells positioned in an upper word line of the target page have been programmed, a P-E cycle, and page position information.

Memory controller 100 generates a CPL GI select signal CPLGI_SEL and a page select signal PAGE_SEL from status estimation information NVM Status in operation S12. CPL GI select signal CPLGI_SEL and page select signal PAGE_SEL are used to determine whether the upper word line of the memory cell has been programmed or to select coupling group index of NVM cells having a coupling effect depending on the position of the target page. At this time, the coupling group index is word line coupling group index, bit line coupling group index, or bit line-word line coupling group index.

CPU 130 generates a command control signal CMD for controlling the read operation of NVM device 200 in response to the select signals PAGE_SEL and CPLGI_SEL in operation S13.

NVM device 200 re-reads the memory cell using a second read voltage generated based on command control signal CMD and decides reliability in operation S14. Data reliability decision bits HD/SD and additional data regarding the re-reading are transmitted from NVM device 200 to memory controller 100 and are used for generating CPL GI. In other words, the CPL GI is generated based on the coupling group information of aggressor cells, which is selected for the NVM cell in response to the select signals PAGE_SEL and CPLGI_SEL, in operation S15. The CPL GI may be set using gray code assignment together with data reliability decision bits HD/SD.

A status value NVM_Sval of the memory cell is generated based on data reliability decision bits HD/SD, the CPL GI, and status estimation information NVM Status in operation S16. ECC decoding is performed based on status value NVM_Sval in operation S17. Where the ECC decoding is successful in operation S18, the read operation ends because the data reliability is ensured. However, where the ECC decoding fails in operation S18, decoding information DecIn is reflected to the estimation of the memory cell status in operation S19 in order to compensate for error bits occurring due to the coupling effect.

The generating of status value NVM_Sval of the memory cell will be described in detail with reference to FIG. 11A and FIG. 11B. Status value NVM_Sval is generated from data reliability decision bits HD/SD and the CPL GI in response to status estimation information NVM Status.

Where it is determined based on status estimation information NVM Status that the upper word line of the memory cell has not been programmed in operation S20, if page select signal PAGE_SEL is not for selecting the MSB page, the ECC decoding is performed without using the coupling group information in operation S21. If page select signal PAGE_SEL is for selecting the MSB page, the CPL GI is generated using the bit line coupling group information in operation S21.

Where it is determined based on status estimation information NVM Status that the upper word line of the memory cell has been programmed in operation S20, where page select signal PAGE_SEL is for selecting the MSB page and CPL GI select signal CPLGI_SEL is for selecting the word line coupling group index in operation S22, the CPL GI is generated using the word line coupling group information and the additional data in operation S23.

Where page select signal PAGE_SEL is for selecting the MSB page and CPL GI select signal CPLGI_SEL is for selecting the bit line coupling group index in operation S22, the CPL GI is generated using the bit line coupling group information and the additional data in operation S24. Where page select signal PAGE_SEL is for selecting the MSB page and CPL GI select signal CPLGI_SEL is for selecting the word line-bit line coupling group index in operation S22, the CPL GI is generated using the word line-bit line coupling group information and the additional data in operation S25. Where page select signal PAGE_SEL is not for selecting the MSB page in operation S22, the CPL GI is generated using the word line coupling group information and the additional data in operation S27. Where page select signal PAGE_SEL is for selecting the LSB page in operation S22, the CPL GI is generated using the word line coupling group information in operation S26.

Consequently, status value NVM_Sval of the memory cell is generated from data reliability decision bits HD/SD and the CPL GI, which is generated differently in a different case, in response to status estimation information NVM Status in operation S28.

Figure 12:
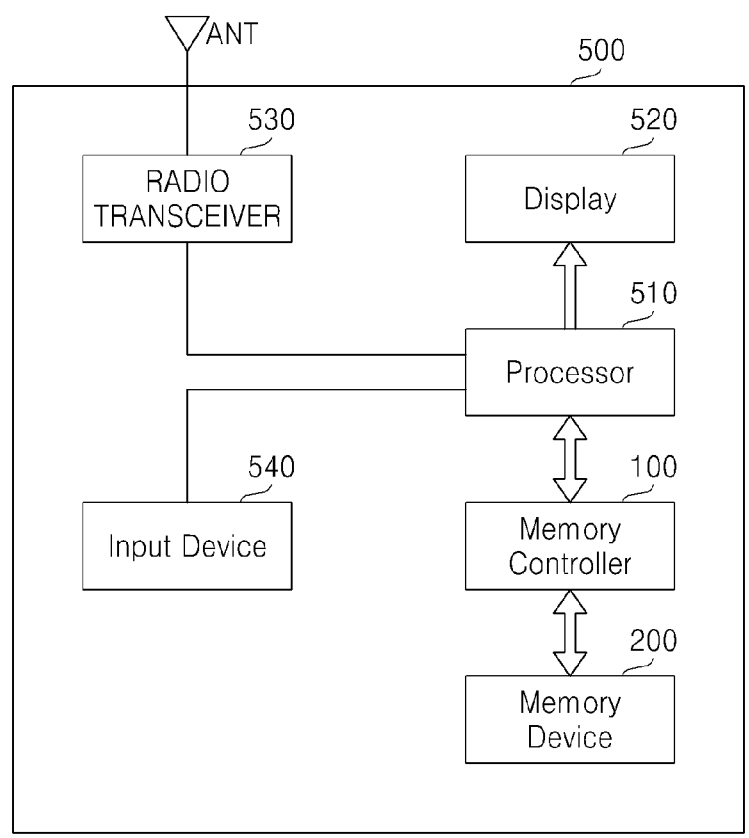
FIG. 12 is a block diagram of a data processing system including the memory system of FIG. 2 according to an embodiment of the inventive concept.

FIG. 12 is a block diagram of a data processing system 500 including memory system 20 of FIG. 2 according to an embodiment of the inventive concept. Referring to FIG. 12, data processing system 500 may be implemented as a cellular phone, a smart phone, a personal digital assistant (PDA) or a radio communication system.

Data processing system 500 comprises memory device 200 and memory controller 100 controlling operations of memory device 200. Memory controller 100 controls data access operations, e.g., a program operation, an erase operation, and a read operation, of memory device 200 according to the control of a processor 510.

The page data programmed in memory device 200 may be displayed through a display 520 according to control of processor 510 and/or memory controller 100.

A radio transceiver 530 transmits or receives radio signals through an antenna ANT. Radio transceiver 530 converts radio signals received through the antenna ANT into signals that can be processed by processor 510. Accordingly, processor 510 may process the signals output from radio transceiver 530 and transmit the processed signals to memory controller 100 or display 520. Memory controller 100 may program the signals processed by processor 510 to memory device 200. Radio transceiver 530 also converts signals output from processor 510 into radio signals and outputs the radio signals to an external device through the antenna ANT.

An input device 540 enables control signals for controlling operation of processor 510 or data to be processed by processor 510 to be input to data processing system 500. Input device 540 may be implemented by a pointing device such as a touch pad or a computer mouse, a keypad, or a keyboard.

Processor 510 may control operation of display 520 to display data output from memory controller 100, data output from radio transceiver 530, or data output from input device 540. Memory controller 100, which controls the operations of memory device 200, may be implemented as a part of processor 510 or as a separate chip.

Figure 13:
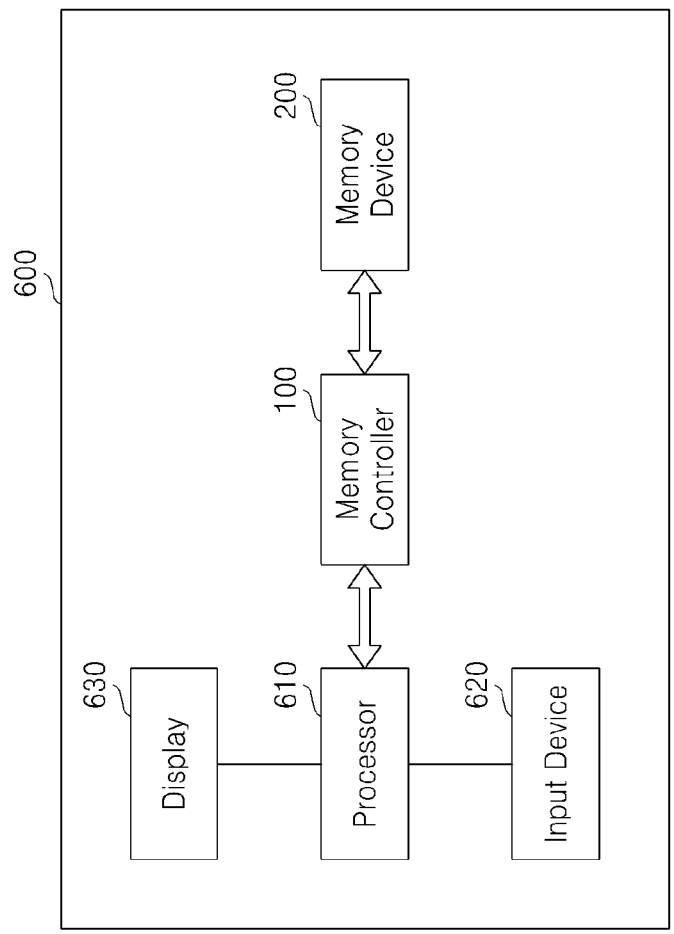
FIG. 13 is a block diagram of a data processing system including the memory system of FIG. 2 according to another embodiment of the inventive concept.

FIG. 13 is a block diagram of a data processing system 600 including memory system 20 of FIG. 2 according to another embodiment of the inventive concept.

Referring FIG. 13, data processing system 600 may be implemented as a PC, a tablet PC, a net-book, an e-reader, a PDA, a portable multimedia player (PMP), an MP3 player, or an MP4 player.

Data processing system 600 comprises memory device 200 and memory controller 100 for controlling the data processing operations of memory device 200. A processor 610 displays data stored in memory device 200 through a display 630 according to data input through an input device 620. Input device 620 may be implemented by a pointing device such as a touch pad or a computer mouse, a keypad, or a keyboard, for example.

Processor 610 may control the overall operation of data processing system 600 and the operations of memory controller 100. Memory controller 100, which may control the operations of memory device 200, may be implemented as a part of processor 610 or as a separate chip.

Figure 14:
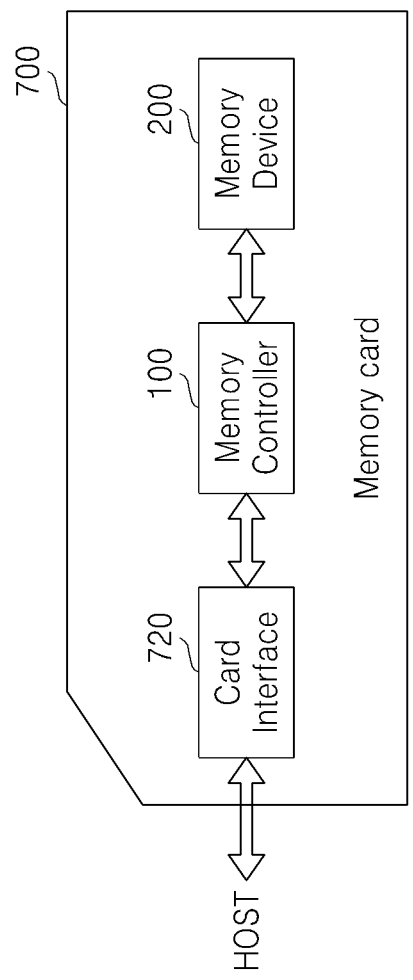
FIG. 14 is a block diagram of a data processing system including the memory system of FIG. 2 according to another embodiment of the inventive concept.

FIG. 14 is a block diagram of a data processing system 700 including memory system 20 of FIG. 2 according to another embodiment of the inventive concept.

Referring FIG. 14, data processing system 700 may be implemented as a memory card or a smart card. Data processing system 700 includes memory device 200, a memory controller 100, and a card interface 720.

Memory controller 100 may control data exchange between memory device 200 and card interface 720. Card interface 720 may be a secure digital (SD) card interface or a multi-media card (MMC) interface, but the inventive concept is not restricted to the current embodiments.

Card interface 720 may interface a host 330 and memory controller 100 for data exchange according to a protocol of host 330. Card interface 720 may support a universal serial bus (USB) protocol and an interchip (IC)-USB protocol. Here, card interface 720 may indicate a hardware supporting a protocol used by host 330, software installed in the hardware, or a signal transmission mode, for example.

Where data processing system 700 is connected with a host such as a PC, a tablet PC, a digital camera, a digital audio player, a cellular phone, a console video game hardware, or a digital set-top box, the host may perform data communication with memory device 200 through card interface 720 and memory controller 100.

Figure 15:
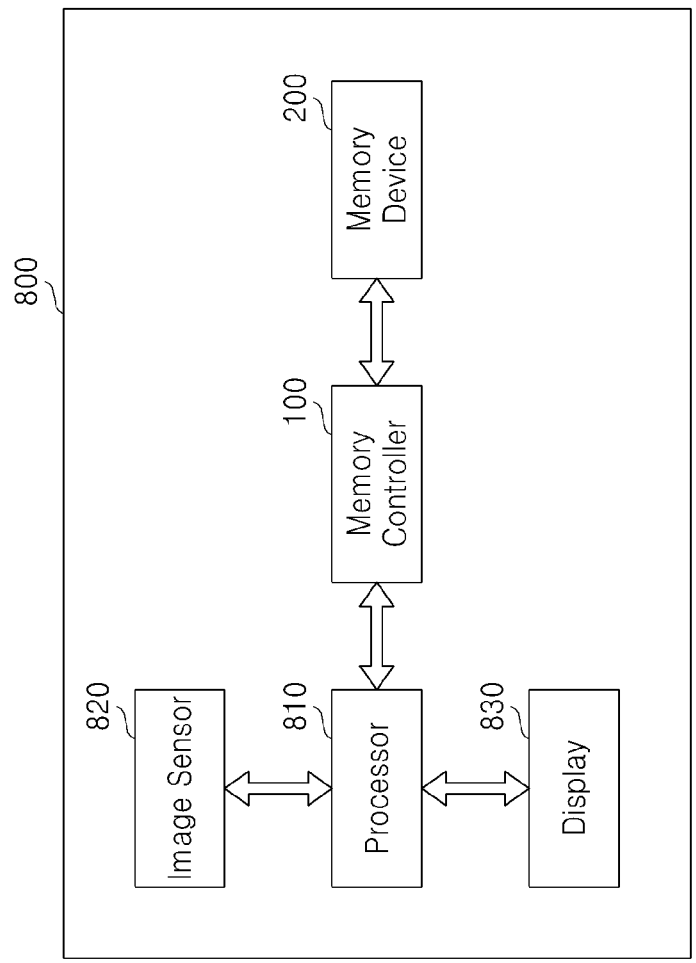
FIG. 15 is a block diagram of a data processing system including the memory system of FIG. 2 according to another embodiment of the inventive concept.

FIG. 15 is a block diagram of a data processing system 800 including memory system 20 of FIG. 2 according to another embodiment of the inventive concept.

Referring FIG. 15, data processing system 800 may be implemented as an image processor like a digital camera, a cellular phone equipped with a digital camera, a smart phone equipped with a digital camera, or a tablet PC equipped with a digital camera.

Data processing system 800 comprises memory device 200 and a memory controller 100 controlling the data processing operations, such as a program operation, an erase operation, and a read operation, of memory device 200. An image sensor 820 in data processing system 800 converts optical images into digital signals and outputs the digital signals to a processor 810 or memory controller 100. The digital signals may be controlled by processor 810 to be displayed through a display 830 or stored in memory device 200 through memory controller 100.

Data stored in memory device 200 may be displayed through display 830 according to control of processor 810 or memory controller 100. Memory controller 100, which may control the operations of memory device 200, may be implemented as a part of processor 810 or as a separate chip.

Figure 16:
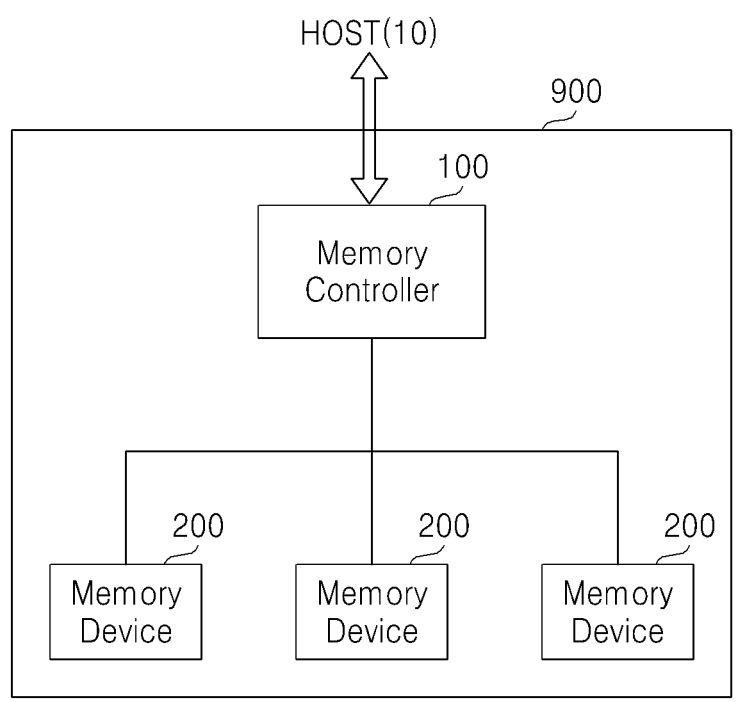
FIG. 16 is a block diagram of a data processing system including the memory system of FIG. 2 according to another embodiment of the inventive concept.

FIG. 16 is a block diagram of a data processing system 900 including memory system 20 of FIG. 2 according to another embodiment of the inventive concept. Referring FIG. 16, data processing system 900 may be implemented as a data storage system like a solid state drive (SSD).

Data processing system 900 includes a plurality of memory devices 200 and a memory controller 100 controlling the data processing operations of memory devices 200. Data processing system 900 may be implemented as a memory module, for example.

Figure 17:
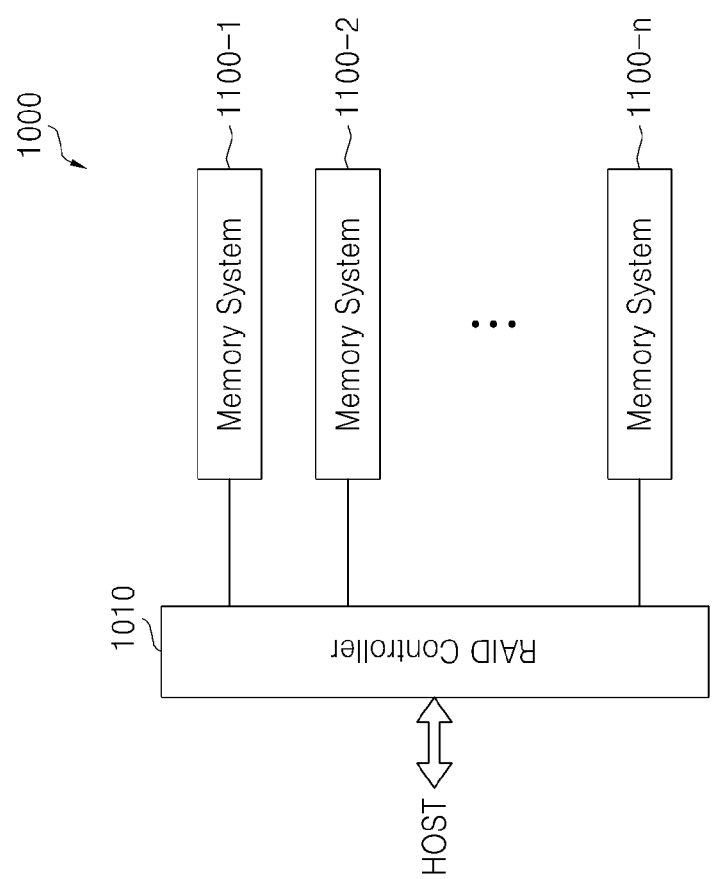
FIG. 17 is a block diagram of a data processing system including the memory system of FIG. 24.

FIG. 17 is a block diagram of a data storage apparatus 1000 including data processing system 900 of FIG. 16.

Referring to FIGS. 16 and 17, data storage apparatus 1000 is implemented as a redundant array of independent disks (RAID) system. Data storage apparatus 1000 comprises a RAID controller 1010 and a plurality of memory modules 1100-1 through 1100-$n$ where "n" is a natural number.

Each of memory modules 1100-1 through 1100-$n$ may be data processing system 900 of FIG. 16. Memory modules 1100-1 through 1100-$n$ may form a RAID array. Data storage apparatus 1000 may be a PC or an SSD.

During a program operation, RAID controller 1010 may transmit program data output from a host to at least one of memory modules 1100-1 through 1100-$n$ according to a RAID level in response to a program command received from the host. During a read operation, RAID controller 1010 may transmit to the host data read from at least one of memory modules 1100-1 through 1100-$n$ in response to a read command received from the host.

Various aspects of the above disclosed embodiments can also be implemented by computer-readable codes on a computer-readable medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. Also, functional programs, codes, and code segments to accomplish the present general inventive concept can be easily construed by programmers.

As indicated by the foregoing, according to certain embodiments of the inventive concept, a read operation of a memory cell is carried out with mechanisms addressing the influence of coupling effect exerted on the memory cell. This can potentially increase data reliability. In addition, the influence of errors is compensated for using a simple method in the read operation of an NVM device, which can increase the performance of the NVM device.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the inventive concept. Accordingly, all such modifications are intended to be included within the scope of the inventive concept as defined in the claims.

What is claimed is:

1. A method of controlling a nonvolatile memory device, comprising:
   receiving status register data for at least one memory cell, the status register data indicating a result of a read operation performed on the memory cell using a first read voltage;
   generating a command control signal based on status estimation information and a select signal, the status estimation information indicating an estimated status of the memory cell based on the status register data;
   re-reading the memory cell using a second read voltage having a value determined by the command control signal; and
   generating a coupling group index based on data reliability decision bits indicating reliability of data that has been re-read from the memory cell, additional data, and the select signal.

2. The method of claim 1, further comprising:
   generating a status value of the memory cell based on the data reliability decision bits, the coupling group index, and the status estimation information; and
   performing error correction code (ECC) decoding based on the status value.

3. The method of claim 2, further comprising determining whether the decoding fails, and modifying the status value upon determining that the decoding fails.

4. The method of claim 1, wherein generating the command control signal comprises:
   estimating the status of the memory cell based on the status register data and generating the status estimation information based on the estimated status;
   selecting a page and the coupling group index based on the status estimation information and generating the select signal to indicating the selected page and the selected coupling group index; and
   generating the command control signal based on the select signal.

5. The method of claim 4, wherein where an upper word line of the memory cell has been programmed, generating the coupling group index comprises:
   where the select signal indicates a most significant bit (MSB) page and the word line coupling group index, generating the coupling group index using word line coupling group information and the additional data;
   where the select signal indicates the MSB page and the bit line coupling group index, generating the coupling group index using bit line coupling group information and the additional data;
   where the select signal indicates the MSB page and the word line-bit line coupling group index, generating the coupling group index using word line-bit line coupling group information and the additional data;
   where the select signal does not indicate the MSB page, generating the coupling group index using the word line coupling group information and the additional data; and
   where the select signal indicates a least significant bit (LSB) page, generating the coupling group index using the word line coupling group information.

6. The method of claim 4, wherein where an upper word line of the memory cell has not been programmed, generating the coupling group index comprises:
   performing the ECC decoding without using the coupling group information where the select signal does not indicate a most significant bit (MSB) page; and
   generating the coupling group index using bit line coupling group information where the select signal indicates the MSB page.

7. A memory controller, comprising:
   a central processing unit (CPU) configured to control a read operation to be performed on at least one nonvolatile memory cell in a nonvolatile memory device using a first read voltage, receive status register data regarding the read operation, and control the at least one memory cell to be re-read using a second read voltage in response to a select signal;
   a data buffer configured to receive data reliability decision bits and additional data, which are output in the read operation, from the nonvolatile memory device and to store the data reliability decision bits and the additional data; and
   a coupling group index unit configured to generate the select signal using coupling group information obtained from the status register data, the data reliability decision bits, and the additional data.

8. The memory controller of claim 7, further comprising an error correction code (ECC) block configured to perform ECC decoding with respect to the read operation and send decoding information to the coupling group index unit when the ECC decoding fails.

9. The memory controller of claim 8, wherein the coupling group index unit comprises:
   a memory cell status estimator configured to generate status estimation information indicating a status of the memory cell, based on the status register data;

a coupling group index selector configured to generate the select signal to select a page and coupling group index from the status estimation information;

a coupling group index generation unit configured to generate the coupling group index using the select signal, the data reliability decision bits, and the additional data; and a memory cell status value generator configured to map the status estimation information to the data reliability decision bits and the coupling group index and generate a status value of the memory cell based on which the ECC decoding is performed;

wherein the additional data comprises word line coupling group information, bit line coupling group information, and word line-bit line coupling group information.

10. The memory controller of claim 9, wherein where an upper word line of the memory cell has been programmed, the coupling group index generation unit generates the coupling group index using the word line coupling group information where the select signal indicates a most significant bit (MSB) page and the word line coupling group index, generates the coupling group index using the bit line coupling group information where the select signal indicates the MSB page and the bit line coupling group index, generates the coupling group index using the word line-bit line coupling group information where the select signal indicates the MSB page and the word line-bit line coupling group index, generates the coupling group index using the word line coupling group information where the select signal does not indicate the MSB page, and generates the coupling group index using the word line coupling group information where the select signal indicates a least significant bit (LSB) page.

11. The memory controller of claim 9, wherein where an upper word line of the memory cell has not been programmed, the coupling group index generation unit performs the ECC decoding without using the coupling group information where the select signal does not indicate a most significant bit (MSB) page and generates the coupling group index using the bit line coupling group information where the select signal indicates the MSB page.

12. The memory controller of claim 9, wherein the coupling group index unit comprises:

a coupling group index generator configured to generate the coupling group index using the select signal and the data reliability decision bits; and a position converter configured to generate a physical position corresponding to a logical position of each of memory cells in a bit line where the coupling group index generator uses the bit line coupling group information or the word line-bit line coupling group information.

13. The memory controller of claim 9, wherein the coupling group comprises a strong group having a strong coupling effect on the memory cell that has been read and a weak group having a weak coupling effect on the memory cell that has been read.

14. The memory controller of claim 9, wherein the status estimation information comprises status information regarding degradation, wherein the status information regarding degradation comprises a program-erase cycle, page information of the memory cell, and information indicating whether memory cells positioned in the upper word line of the memory cell have been programmed.

15. A memory system comprising a nonvolatile memory device and the memory controller of claim 8, wherein the memory controller controls operation of the nonvolatile memory device.

16. A memory system, comprising:

a nonvolatile memory device comprising a memory cell array comprising a plurality of nonvolatile memory cells, an access circuit configured to perform a read operation on at least one memory cell among the nonvolatile memory cells and to generate data reliability decision bits, control logic configured to control the access circuit using a control signal and to generate status register data regarding the at least one memory cell according to the read operation, and a coupling group index generator configured to generate a coupling group index according to the read operation; and a memory controller comprising a memory cell status estimator configured to generate status estimation information indicating a status of the memory cell based on the status register data, a coupling group index selector configured to generate a select signal for selecting a page and coupling group index from the status estimation information, and a memory cell status value generator configured to map the status estimation information to the data reliability decision bits and the coupling group index and generate a status value of the memory cell for error correction code (ECC) decoding.

17. The memory system of claim 16, wherein the controller performs ECC decoding based on the status value, determines whether the decoding fails, and modifies the status value to reflect a failure of the decoding.

18. The memory system of claim 16, wherein the read operation uses a first read voltage, wherein when the upper word line of the memory cell has been programmed, the coupling group index generator generates the coupling group index using word line coupling group information and additional data where the select signal indicates a most significant bit (MSB) page, and using the word line coupling group information and the additional data where the selected signal does not indicate the MSB page, and using the word line coupling group information where the select signal indicates a least significant bit (LSB) page, and wherein when the upper word line of the memory cell has not been programmed, the coupling group index generator generates the coupling group index using bit line couple group information where the select signal indicates the MSB page.

19. The memory system of claim 18, wherein the additional data comprises the data reliability decision bits corresponding to data read from the memory cell and the word line coupling group information.

20. The memory system of claim 16, wherein the read operation uses a first read voltage, wherein the nonvolatile memory device is further configured to re-read the memory cell using a second read voltage having a value determined by a command control signal derived from the status register data.

* * * * *